United States Patent [19]
Shiina et al.

[11] Patent Number: 5,325,141
[45] Date of Patent: Jun. 28, 1994

[54] CAMERA CONTROL DEVICE

[75] Inventors: Michihiro Shiina; Fumio Iwai; Katsuji Ozawa, all of Omiya, Japan

[73] Assignee: Fuji Photo Optical Company, Limited, Saitama, Japan

[21] Appl. No.: 868,420

[22] Filed: Apr. 15, 1992

[30] Foreign Application Priority Data

| Apr. 17, 1991 | [JP] | Japan | 3-112429 |
| Apr. 17, 1991 | [JP] | Japan | 3-112430 |
| Apr. 17, 1991 | [JP] | Japan | 3-112431 |

[51] Int. Cl.$^5$ .............................................. G03B 1/18
[52] U.S. Cl. ................................................ 354/173.1
[58] Field of Search ................... 354/173.1, 212–218, 354/484

[56] References Cited

U.S. PATENT DOCUMENTS 4,676,621  6/1987  Malloy Desormeaux ....... 354/173.1
4,916,474  4/1990  Miyazawa et al. ............. 354/484 X

*Primary Examiner*—Howard B. Blankenship

[57] ABSTRACT

A camara control device continues a pre-winding or a first frame setting when a pre-winding or a first frame setting is stopped in the middle because a battery of the camera is taken out or because of exhaustion of the battery and after that another battery is loaded. The camera control device writes a pre-wind signal to an electrically rewritable non-volatile memory E$^2$PROM when a pre-winding is started and erases the pre-wind signal in the E$^2$PROM when the pre-winding is finished, and writes a first frame set signal to the E$^2$PROM when a first frame setting is started and erases the first frame set signal in the E$^2$PROM when the first frame setting is finished. If the pre-winding or the first frame setting is stopped in the middle, the pre-wind signal or the first frame set signal in the E$^2$PROM is not erased. The camera control device, responsive to loading of the battery to the camera, continues the pre-winding or the first frame setting when the pre-wind signal or the first frame set signal is left in the E$^2$PROM.

20 Claims, 18 Drawing Sheets

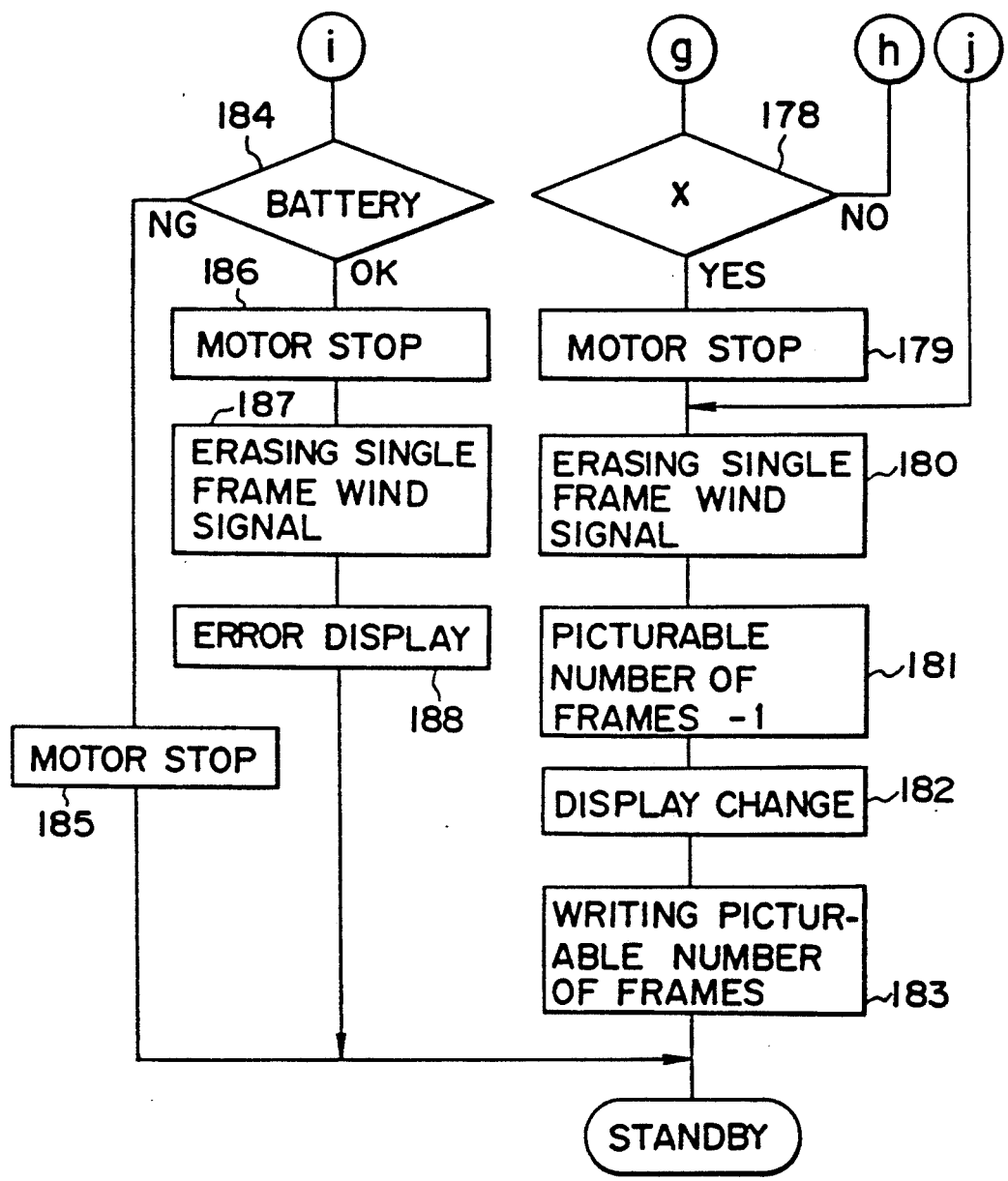

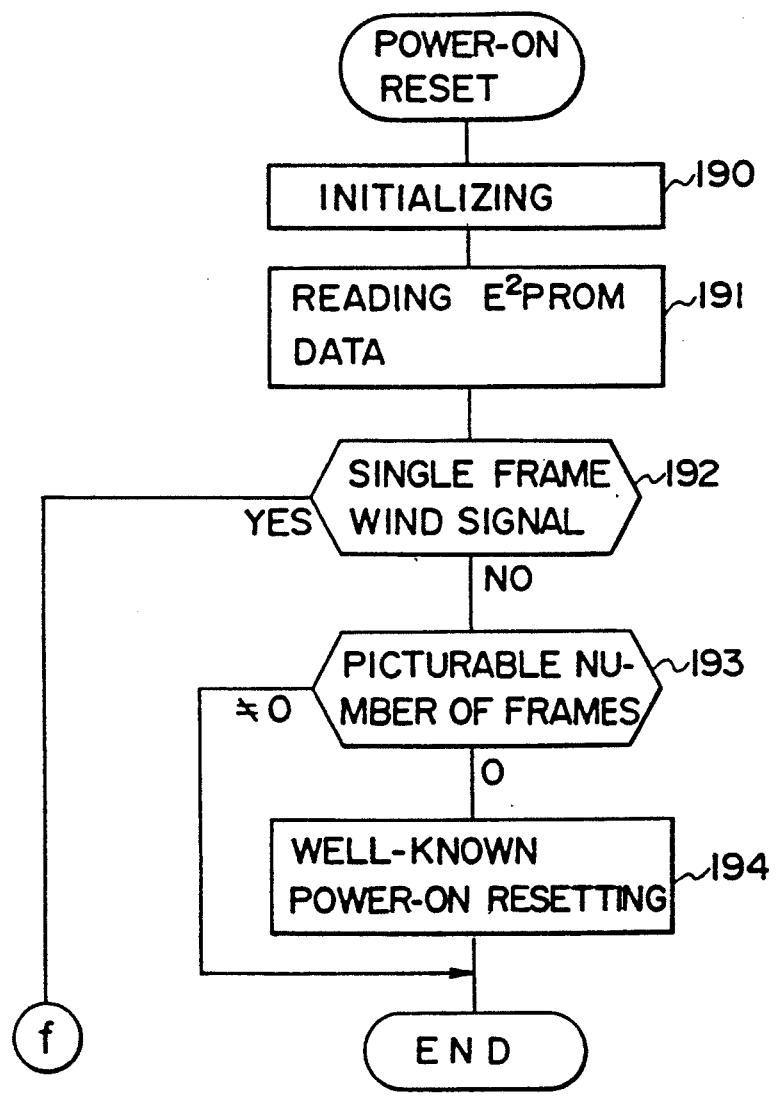

CAMERA CONTROL DEVICE

BACKGROUND OF THE INVENTION

The present invention relates to a camera control device having an electrically rewritable non-volatile memory E$^2$PROM (Electronic Erasable and Programmable ROM).

In case of a camera of a film pre-wind type, a film of a patrone is pre-wound to a spool when the patrone is loaded in the camera. After the film is wound to the spool completely, a first frame setting for rewinding the film to the patrone by a prescribed length is performed to set a first frame. In ordinary camera of the pre-wind type, if another battery is loaded after a battery is taken out during a pre-winding or a first frame setting, or after a pre-winding or a first frame setting being stopped in the middle due to exhaustion of the battery, a film which is in the middle of a pre-winding or a first frame setting without continuing the pre-winding or the first frame setting is rewound. Because of this, in the case of the ordinary camera of the pre-wind type, a loaded film cannot be used continuously and a new film must be loaded if a situation as mentioned above has occurred, and as a result, not only the film is wasted but operation an for loading another film is also required.

Also, for such a camera, if a battery is taken out or an operating power is stopped due to exhaustion of the battery during an exposure, power for operating a shutter is not supplied and the shutter is left opened. In ordinary camera, when another battery is loaded under such a situation, only the shutter is closed or the shutter is closed and a film is rewound to a patrone. Because of this, in the case of the ordinary camera and if a situation as mentioned above has occurred, double exposure is caused by taking a picture after loading another battery, or the film is rewound to the patrone and remaining picturable frames of the film are thereby made unusable. As means for improving this, a single frame winding of the film at time of loading another battery can be considered. However, by this, a single frame winding of the film is always conducted by loading a battery regardless of whether the battery is taken out or not, and it may cause loss of picturable frames of the film.

Also, for such a camera, if a battery is taken out or operating power is stopped due to exhaustion of the battery during a single frame winding of a film, driving power is not supplied to a film feed motor and the single frame winding is stopped in the middle. An ordinary camera, when another battery is loaded under such a situation, goes to a standby status for allowing pictures to be taken under a status of a single frame winding stopped in the middle, or rewinds the film to the patrone, without continuing the single frame winding. Because of this, in the case of the ordinary camera and if a situation as mentioned above has occurred, double exposure is caused by taking pictures after loading another battery, or the film is rewound to the patrone and remaining picturable frames of the film are made unusable. As means for improving this, a single frame winding of the film at the time of loading another battery can be considered. However, by this, a single frame winding of the film is always conducted by loading of a battery regardless of whether the battery is taken out or not, and it may cause loss of picturable frames of the film.

SUMMARY OF THE INVENTION

It is an object of the present invention to provide an improved camera control device.

Another object of the present invention is to provide a camera control device which can prevent loss of film and solve difficulties of reloading a film by continuing a pre-winding and a first frame setting i the case that another battery is loaded after the pre-winding or the first frame setting is stopped in the middle because a battery is taken out or due to exhaustion of the battery during the pre-winding or the first frame setting.

Still another object of the present invention is to provide a camera control device which can prevent double exposure and loss of film the case that another battery is loaded after a battery is taken out during an exposure or after an exposure operation is stopped in the middle because of exhaustion of the battery.

Still another object of the present invention is to provide a camera control device which can prevent double exposure and loss of film in the case that another battery is loaded after a battery is taken out during a single frame setting or after a single frame setting is stopped in the middle because of exhaustion of the battery.

The above and other objects are attained by a camera control device comprising; pre-winding means, responsive to a close operation of a rear lid of a camera, for starting a pre-winding for winding a film of a patrone to a spool, said pre-winding means finishing the pre-winding by winding the film of the patrone to the spool completely and counting a picturable number of frames of the film which are wound to the spool; first frame setting means, responsive to an end of the pre-winding of said pre-winding means, for starting a first frame setting for setting a first frame of the film, said first frame setting means finishing the first frame setting by rewinding the film to the patrone by a prescribed length; an electrically rewritable non-volatile memory E$^2$PROM; pre-wind signal rewriting means for writing a pre-wind signal to said E$^2$PROM responding to a start of the pre-winding of said pre-winding means, and erasing the pre-wind signal in said E$^2$PROM responding to an end of the pre-winding of said pre-winding means; number of frames rewriting means, responsive to a count of the picturable number of frames of the film of said pre-winding means, for rewriting a picturable number of frames of the film each time said pre-winding means counts a picturable number of frames of the film; first frame set signal rewriting means for writing a first frame set signal to said E$^2$PROM responding to a start of the first frame setting of said first frame setting means, and for erasing the first frame set signal in said E$^2$PROM responding to an end of the first frame setting of said first frame setting means; and pre-wind/first frame set continuing means, responsive to loading of a battery to the camera, for driving said pre-winding means or said first frame setting means in case the pre-wind signal or the first frame set signal is left in said E$^2$PROM, respectively, using a picturable number of frames of the film memorized in said E$^2$PROM.

Also, the above and other objects are attained by adding an undermentioned composition to above-mentioned camera control device. The composition comprises shutter control means for opening/closing a shutter; single frame winding means for winding a frame of the film; exposure signal rewriting means, responsive to an on operation of a release switch, for writing an exposure signal to said E²PROM before starting an exposure, said exposure signal rewriting means erasing an exposure signal in said E²PROM when the exposure is finished normally; and shutter/single frame wind controlling means, responsive to loading of a battery to the camera, for winding a frame of the film by driving said frame winding means after closing the shutter by driving said shutter controlling means in case the exposure signal is left in said E²PROM.

Also, above and other objects are attained by adding an undermentioned composition to above-mentioned camera control device. The composition comprises frame pulse generating means for generating a frame pulse each time the film is fed by a prescribed length; single frame winding means for starting a single frame winding of the film responding to an end of exposure, said single frame winding means counting frame pulses of said frame pulse generating means, and finishing the single frame winding when frame pulses reach a predetermined number after starting the single frame winding; single frame wind signal rewriting means for writing a single frame wind signal to said E²PROM responding to the end of exposure, and erasing the single frame wind signal in said E²PROM responding to the end of the single frame winding of the film of said single frame winding means; frame pulse rewriting means, responsive to a count of frame pulses of said single frame winding means, for rewriting a count value of frame pulses to said E²PROM each time said single frame winding means counts a frame pulse; and single frame wind continuing means, responsive to loading of a battery to the camera, for driving said single frame winding means using the count value of frame pulses memorized in said E²PROM in case the single frame wind signal is left in said E²PROM.

BRIEF DESCRIPTION OF THE DRAWINGS

The foregoing objects, features and attendant advantages of the present invention will be appreciated as the same become better understood by means of the following description and accompanying drawings wherein;

FIG. 18 is a flow diagram of the microcomputer of FIG. 15, showing a processing of single frame winding which is connected to FIG. 17; and FIG. 19 is a flow diagram of the microcomputer of FIG. 15, showing a processing of power-on reset executed when a battery is loaded after the time that the power source is backed up passes.

DETAILED DESCRIPTION OF THE PREFERRED EMBODIMENTS OF THE PRESENT INVENTION

Figure 1:
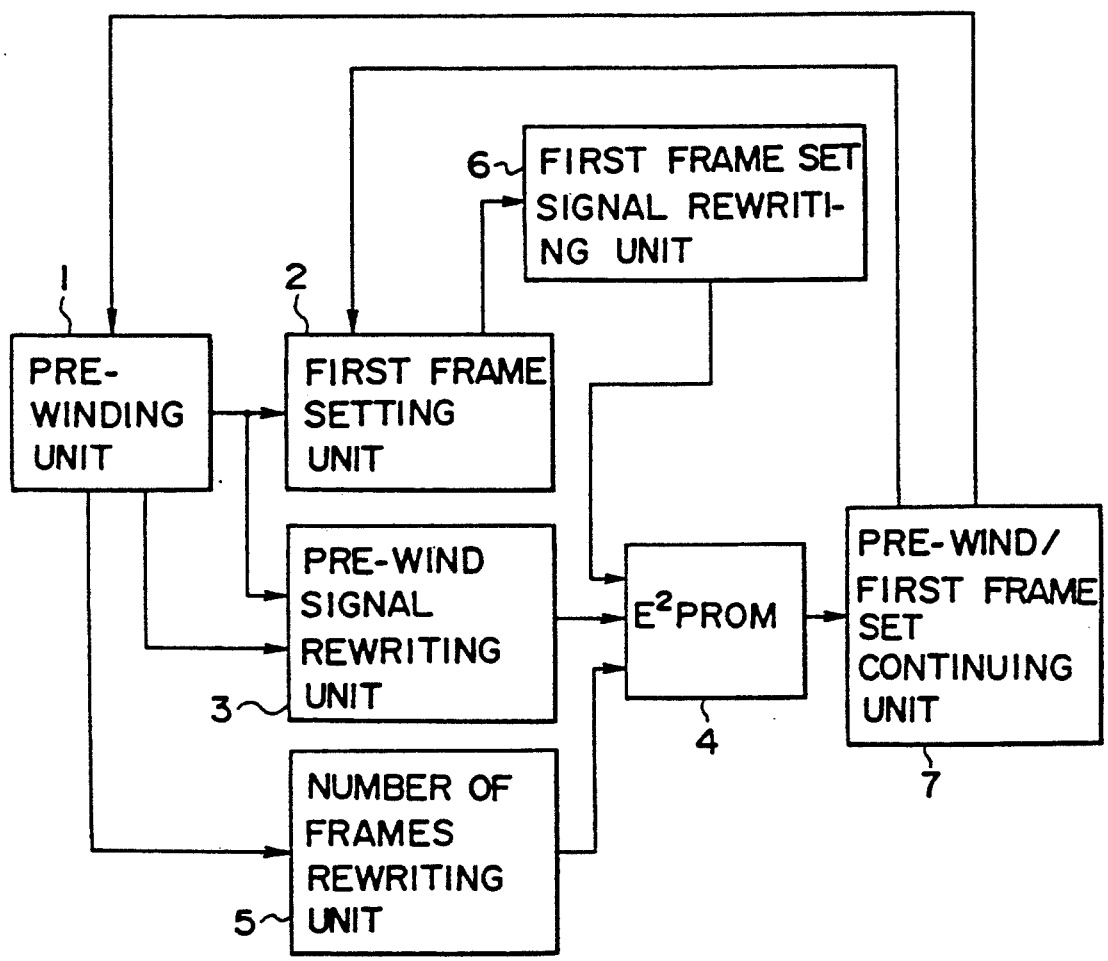
FIG. 1 is a block diagram showing a first fundamental embodiment of a camera control device according to the present invention.

In a first fundamental embodiment of FIG. 1, a pre-winding winding unit 1, responsive to an a close operation of a rear lid of a camera, starts a pre-winding for winding a film of a patrone to a spool, and finishes the pre-winding when the film of the patrone is wound up to the spool completely. The pre-winding unit 1 also count a number of frames wound up to the spool during the pre-winding. A first frame setting unit 2, responsive to an end of a pre-winding of the pre-winding unit 1, starts a first frame setting for setting a first frame of the film, and finishes the first frame setting when the film is rewound to the patrone by prescribed length. A pre-wind signal rewriting unit 3, writes a pre-wind signal to an electrically rewritable non-volatile memory E²PROM4 responding to a start of a pre-winding of the pre-winding means 1, and erases a pre-wind signal written in the E²PROM4 responding to an end of the pre-winding of the pre-winding unit 1. A number of frames rewriting unit 5, responsive to a number of frames of the film counted by the pre-winding unit 1, rewrites a counted number of frames of the film each time a number of frames of the film is counted. A first frame set signal rewriting unit 6, writes a first frame set signal to the E²PROM4 responding to a start of a first frame setting of the first frame setting unit 2, and erases a first frame set signal written in the E²PROM4 responding to an end of the first frame setting of the first frame setting unit 2. A Pre-wind/first frame set continuing unit 7, responsive to loading of a battery to the camera, and using a number of frames of the film memorized in the E$^2$PROM$^4$, continues a pre-winding by driving the pre-winding unit 1 when a pre-wind signal is left written in the E$^2$PROM$^4$, and continues a first frame setting by driving the first frame setting unit 2 when a first frame set signal is left written in the E$^2$PROM$^4$. According to a composition like this, a pre-wind signal or a first frame set signal is left memorized in the E$^2$PROM$^4$ when a battery is taken out during a pre-winding or a first frame setting or a pre-winding or a first frame setting is stopped in the middle due to exhaustion of the battery, and a number of frames of the film wound up to the spool before the pre-winding is stopped in the middle is left in the E$^2$PROM$^4$. When another battery is loaded, the pre-wind/first frame set continuing unit 7, using the number of frames memorized in the E$^2$PROM$^4$, continues the pre-winding by driving the pre-winding unit 1 if a pre-wind signal is left written in the E$^2$PROM$^4$, or continues the first frame setting by driving the first frame setting unit 2 if a first frame set signal is left written in the E$^2$PROM$^4$. The contents of the foregoing first fundamental embodiment will be better understood by a first preferred embodiment to be described as follows.

Figure 2:
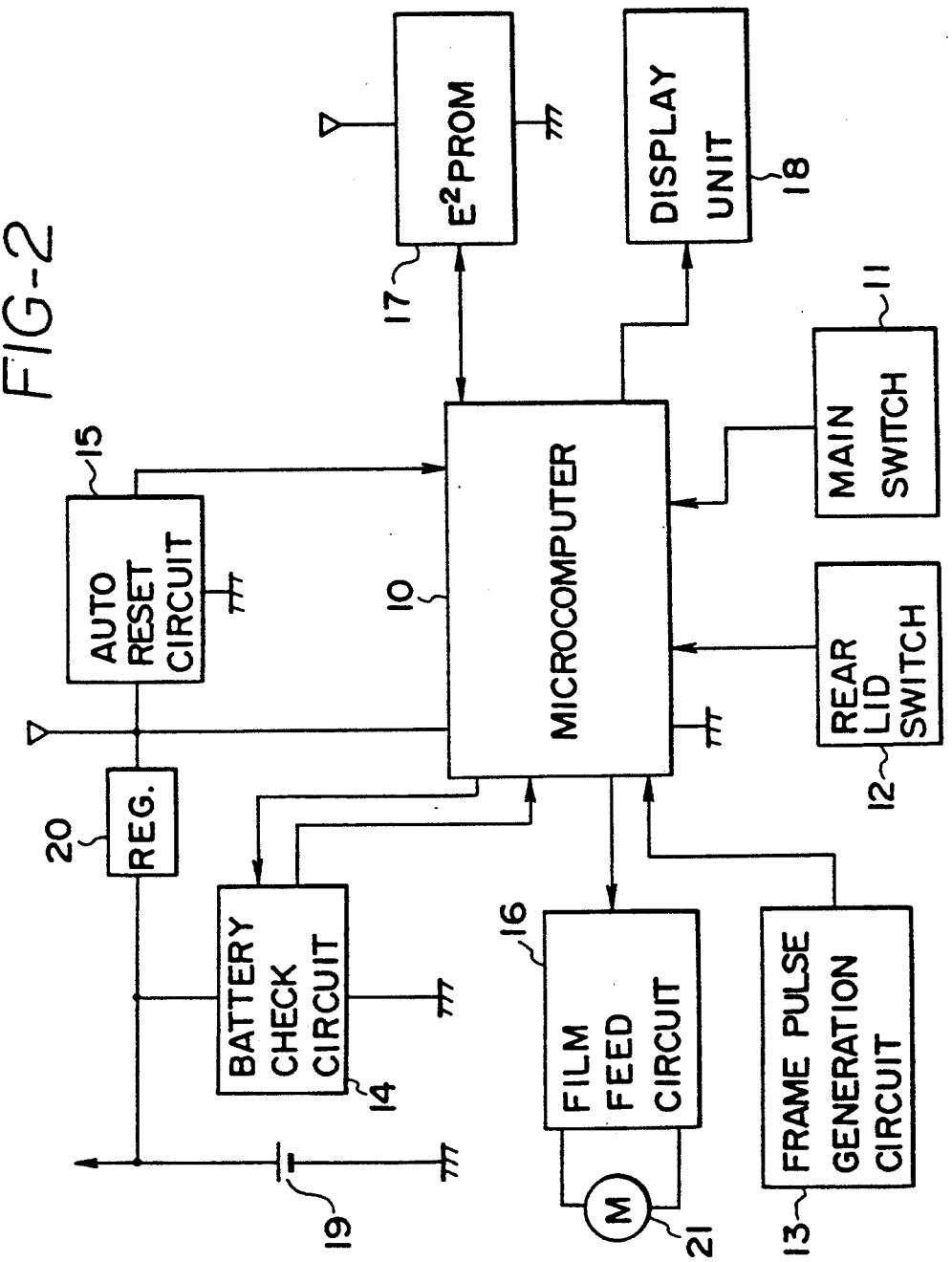
FIG. 2 is a block diagram showing a first preferred embodiment of the camera control device according to the present invention.

In a first preferred embodiment as illustrated in FIG. 2, a reference numeral 10 refers to a microcomputer. The microcomputer 10 receives an on/off signal from a main switch 11, an on/off signal from a rear lid switch 12, a frame pulse from a frame pulse generation circuit 13, a battery check information from a battery check circuit 14, and a reset signal from an auto reset circuit 15. The microcomputer 10 performs driving of the battery check circuit 14, driving of the film feed circuit 16, writing/reading of an electrically rewritable nonvolatile memory E$^2$PROM$^{17}$, and control of a display unit 18. A reference numeral 19 refers to a battery of the camera, which supplies power to the film feed circuit 16 and the other circuits, and supplies power to the microcomputer 10 and the E$^2$PROM$^{17}$ via a regulator 20.

The main switch 11 is interlocked with an a close operation of a lens barrier which is a cover of a taking lens. The main switch 11 gives an on signal to the microcomputer 10 when the lens barrier is opened. The rear lid switch 12 is interlocked with an open/close operation of a rear lid of the camera. The rear lid switch 12 gives an on signal to the microcomputer 10 when the rear lid of the camera is closed. The frame pulse generation circuit 13 generates a frame pulse each time the film is fed for a prescribed length based on a detection of perforation of the film, and gives the frame pulse to the microcomputer 10. The battery check circuit 14 is connected in parallel with a battery 19 of the camera, and gives battery check information, which indicates whether a voltage of the battery 19 is equal to or above a predetermined voltage in response to a request of the microcomputer 10. The predetermined voltage is set experimentally based on a voltage level at which a camera system becomes unable to operate normally. The auto reset circuit 15 is connected to the battery 19 via the regulator 20, and gives a reset signal to the microcomputer 10 when the battery 19 is loaded. The microcomputer 10, as is well known, is backed up by a backup capacitor (not shown in the drawings) for a power source only for a short time. The auto reset circuit 15 does not give a reset signal when another battery 19 is loaded during a time that the power source is backed up. The film feed circuit 16 drives a film feed motor 21 for a regular/reverse rotation under a control of of the microcomputer 10. The display unit 9 displays a number of picturable frames of the film and others under a control of the microcomputer 10.

The microcomputer 10 has functions for conducting prewinding and first frame setting. Moreover, the microcomputer 10 has the following functions. The microcomputer 10 writes a pre-wind signal, for indicating that pre-winding is in operation, and a first frame set signal, for indicating that first frame setting is in operation, to the E$^2$PROM$^{17}$. The microcomputer 10 erases a pre-wind signal and first frame set signal from E2-PROM$^{17}$. The microcomputer 10 rewrites a number of frames of the film wound up to the spool by pre-winding to the E$^2$PROM$^{17}$. The microcomputer 10, when the battery 19 is taken out in the middle of a pre-winding of a first frame setting, or when a pre-winding of a first frame setting is stopped in the middle because of exhaustion of the battery 19, continues the pre-winding or the first frame setting based on a pre-wind signal, a first frame set signal and a number of frames of the film.

The microcomputer 10 writes a pre-wind signal to the E$^2$PROM$^{17}$ when a pre-winding is started, and rewrites a number of frames of the film wound up to the spool by the pre-winding to the E$^2$PROM$^{17}$. The microcomputer 10 finishes a pre-winding when the film of the patrone is wound up completely to the spool, and erases a pre-wind signal written in the E$^2$PROM$^{17}$ when the pre-winding is finished. When the battery 19 is taken out during a pre-winding, or when a pre-winding is stopped in the middle because the battery 19 becomes exhausted, a pre-wind signal is left memorized in the E$^2$PROM$^{17}$, and a number of frames of the film already wound up to the spool is left in the E$^2$PROM$^{17}$. The microcomputer 10, when another battery 19 is loaded, reads the pre-wind signal and the number of frames of the film from the E$^2$PROM$^{17}$, and continues the pre-winding using the number of frames of the film of a time when the pre-winding was stopped. The microcomputer 10, when a first frame setting is started, writes a first frame set signal to the E$^2$PROM$^{17}$, and erases the first frame set signal when the first frame setting is finished. If a first frame setting is stopped in the middle because the battery 19 is taken out or the battery 19 becomes exhausted during the first frame setting, the first frame set signal is left memorized in the E$^2$-PROM$^{17}$. The microcomputer 10, when another battery 19 is loaded, reads the first frame set signal from the E$^2$PROM$^{17}$, and continues the first frame setting. These functions of the microcomputer 10 will be better understood by referring to FIGS. 3, 4, 5 and 6.

Figure 3:
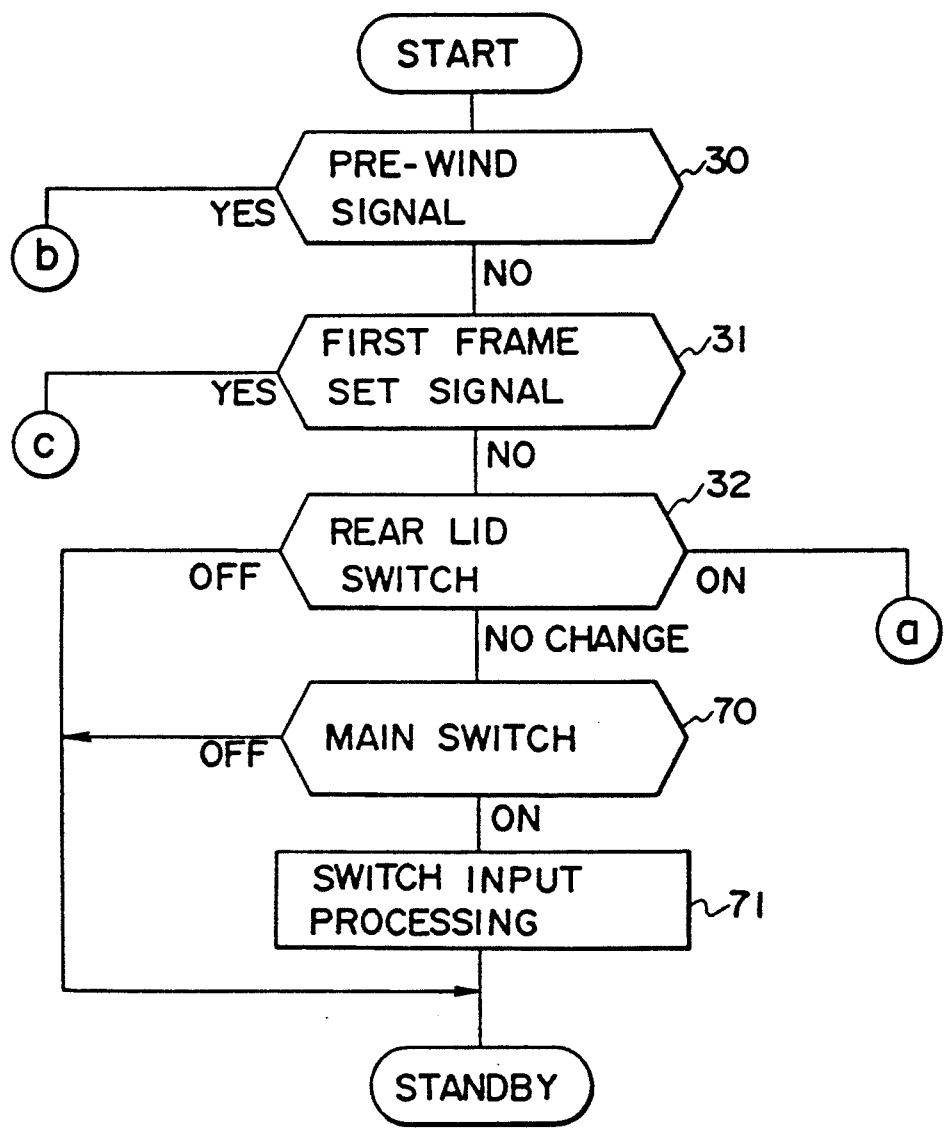
FIG. 3 is a flow diagram of a microcomputer of FIG. 2, showing a processing executed by switch operation including a main switch and a rear cover switch, or when a battery is loaded within a time that a power source is backed up.
Figure 4:
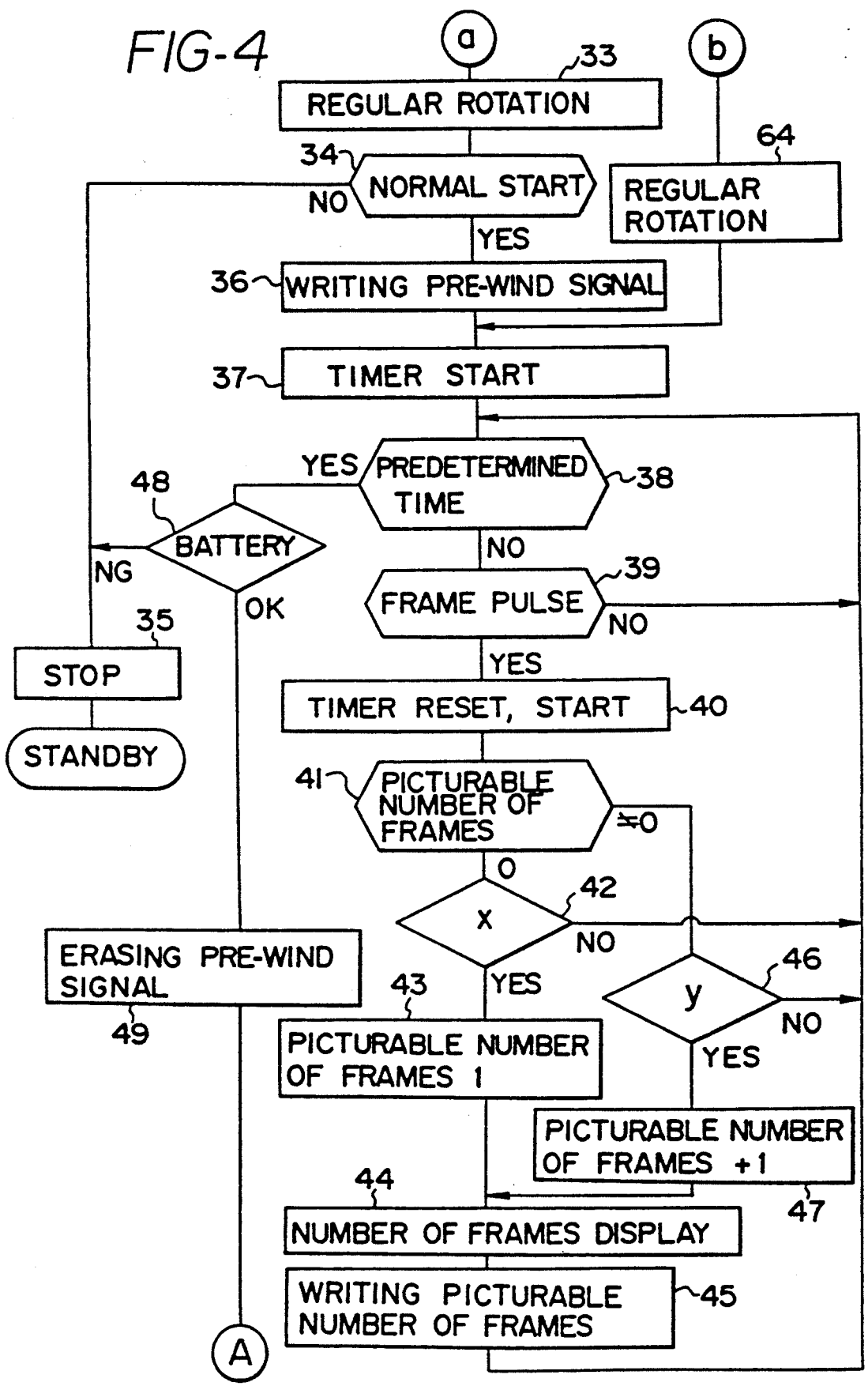
FIG. 4 is a flow diagram of the microcomputer of FIG. 2, showing a processing of pre-winding.
Figure 5:
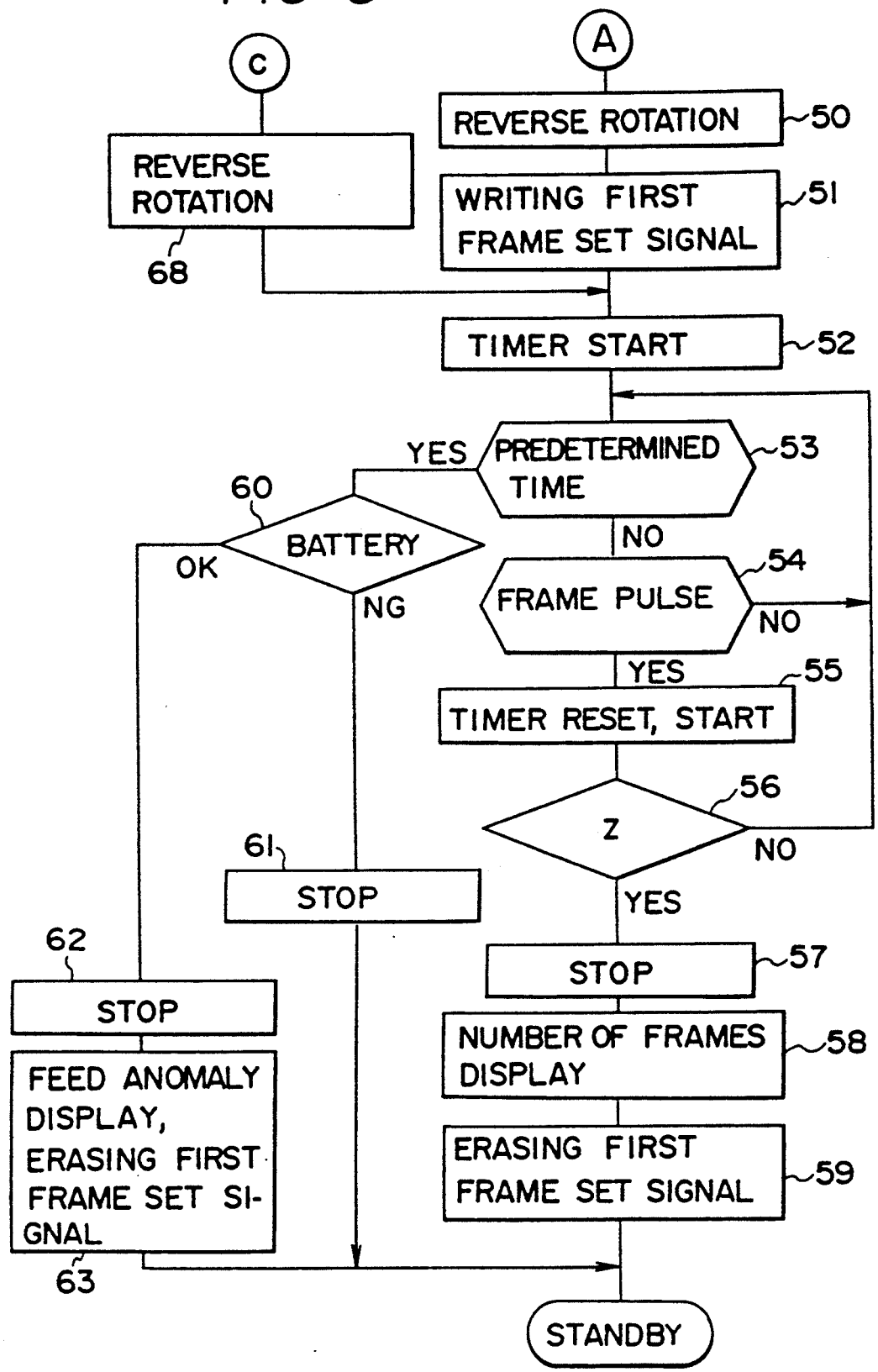
FIG. 5 is a flow diagram of the microcomputer of FIG. 2, showing a processing of first frame setting.
Figure 6:
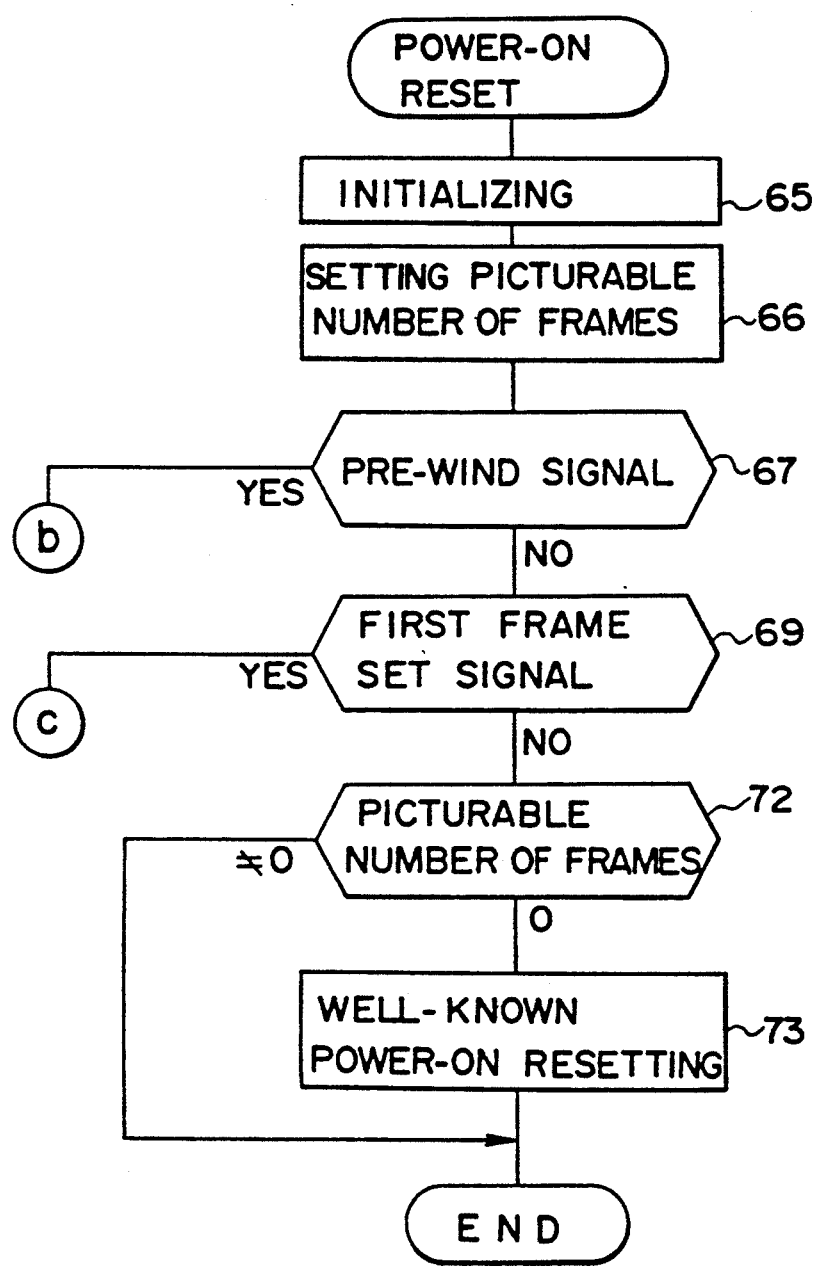
FIG. 6 is a flow diagram of the microcomputer of FIG. 2, showing a processing of power-on reset executed when a battery is loaded after a time that the power source is backed up passes.

FIGS. 3, 4, 5 and 6 are flow diagrams of the microcomputer 10 of FIG. 2. FIG. 3 shows switch operations including the main switch 11 and the rear lid switch 12, or a processing executed when a battery 19 is loaded within a time that the power source is backed up. FIG. 4 shows a processing of pre-winding. FIG. 5 shows a processing of first frame setting. FIG. 6 shows a processing of power-on reset executed when a battery 19 is loaded after a time that the power source is backed up passes. Terminals a, b and c of FIGS. 3 and 6 are connected to terminals a, b and c, having the same marks, of FIGS. 4 and 6, and a terminal A of FIG. 4 is connected to a terminal A, having the same mark, of FIG. 5.

When a film is loaded and the rear lid of the camera is closed, the rear lid switch 12 gives the microcomputer 10 an on signal. By this, the microcomputer 10 starts a control of FIG. 3, and through a judgment of existence/non-existence of a pre-wind signal of at a step 30, a judgment of existence/non-existence of a first frame set signal of a step 31, and a status judgment of the rear lid switch 12 of a step 32, enters a processing of pre-winding of FIG. 4.

The microcomputer 10 starts winding the film from the patrone to the spool by driving the film feed motor 21 for a regular rotation in a step 33, and judges whether or not a pre-winding is started normally in a step 34 to follow. This judgment is conducted based on whether or not a frame pulse is given from the frame pulse generation circuit 13 within a prescribed time after the start of the pre-winding. If a frame pulse is not given within the prescribed time, the microcomputer 10 stops the film feed motor 21 in a step 35, and goes to a standby status. If a frame pulse is given within the prescribed time, the microcomputer 10, recognizes that the pre-winding is started normally, and enters a step 36. The microcomputer 10 writes a pre-wind signal to the E$^2$PROM$^{17}$ in the step 36, and sets a predetermined time to an internal timer and starts the internal timer in a step 37. This predetermined time is set based on a time interval from a time that a frame pulse is given to a time that the next frame pulse is given during a normal pre-winding. The microcomputer 10 judges whether or not the predetermined time is passed in a step 38 to follow, and if the predetermined time is not passed, the operation proceeds from the step 38 to a step 39, and judges whether or not a frame pulse is given. The microcomputer 10 returns from the step 39 to the step 38 if a frame pulse is not given. If a frame pulse is given, the microcomputer 10 resets and restarts the internal timer in a step 40 to follow, and proceeds to a step 41.

In the step 41, whether or not a number of frames of the film wound up to the spool is 0 is judged. A number of frames of the film pre-wound to the spool is counted by the internal counter. In the present embodiment, as described later, a number of frames of the film is set to 1 when x pieces of frame pulses are given from the frame pulse generation circuit 13 after a pre-winding is started normally. After that, the number of frames of the film is incremented by +1 each time y pieces of frame pulses are given. As a number of frames of the film wound up to the spool is 0 when a pre-winding is started, the microcomputer 10 proceeds from the step 41 to a step 42, and judges whether or not frame x pieces of pulses are given from the frame pulse generation circuit 13. If frame pulses have not reached x pieces, the microcomputer 10 proceeds from the step 42 to the step 38. When frame pulses reach x pieces, the microcomputer 10, entering a step 43, sets a number of frames of the film wound up to the spool to 1, and resets a count of frame pulses.

After that, the microcomputer 10, displaying a current number of frames wound up to the spool on the display unit 18 in a step 44, writes the current number of frames wound up to the spool in the E$^2$PROM$^{17}$ in a step 45 to follow, and returns to the step 38. When a number of frames is set to 1 in the step 43, the microcomputer 10 enters the step 46 through steps 38, 39, 40 and 41, and judges whether or not y pieces of frame pulses are given. If frame pulses have not reached y pieces, the microcomputer 10 returns to the step 38. When frame pulses reach y pieces, the microcomputer 10, entering a step 47 to follow, increments a number of frames of the film wound up to the spool by +1, resets a count of frame pulses, and returns to the step 38 through steps 44 and 45. When the film is wound up from the patrone to the spool completely, the microcomputer 10 enters from the step 38 to a step 48.

The microcomputer 10 takes battery information from the battery check circuit in the step 48, and judges whether or not a voltage of the battery is equal to or above a predetermined voltage. If a voltage of the battery 19 is below the predetermined voltage, the microcomputer 10 proceeds to the step 35. When a voltage of the battery 19 is equal to or above the predetermined voltage, the microcomputer 10, recognizing that a pre-winding is finished normally, proceeds a step 49, and erasing the pre-wind signal written to the E$^2$PROM$^{17}$ in the step 36, goes to a processing of first frame setting of FIG. 5. If the battery 19 is taken out during a pre-winding, erasure of a pre-wind signal in the step 49 is not done. If a pre-winding is stopped in the middle because of exhaustion of the battery 19, a standby status is reached through steps 38, 48 and 35, and likewise erasure of a pre-wind signal is not done. Additionally, if a pre-winding is stopped in the middle, a number of frames of the film wound up to the spool up to the time is stored in the E$^2$PROM$^{17}$.

In the first frame setting of FIG. 5, the microcomputer 10 starts a first frame setting by reversely driving the film feed motor 21 in a step 50, writes a first frame set signal to the E$^2$PROM$^{17}$ in a step 50, and sets a predetermined time to the internal timer and starts the internal timer in a step 52. The microcomputer 10 judges whether or not the predetermined time is passed in a step 53 to follow, and if the predetermined time is not passed, the microcomputer judges whether or not a frame pulse is given or not in a step 54. If a frame pulse is not given, the microcomputer 10 returns from the step 54 to the step 53. When a frame pulse is given, the microcomputer 10 resets and starts the internal timer in a step 55, and proceeds a step 56. The microcomputer 10 judges whether or not z pieces of frame pulses are given in the step 56. If frame pulses have not reached z pieces, the microcomputer 10 returns to the step 53. When frame pulses reach z pieces, the microcomputer 10 proceeds to a step 57, and stops the reverse driving of the film feed motor 21. After that, the microcomputer 10 displays a number of frames of the film after a first frame setting on the display unit 18 in the step 48, and erases the first frame set signal of the E$^2$PROM$^{17}$ in a step 59 to follow, and goes to a standby status.

If a frame pulse is not given for more than the predetermined time, the microcomputer 10, proceeding from the step 53 to a step 60, takes battery check information from the battery check circuit 14, and judges whether or not a voltage of the battery 19 is equal to or above the predetermined voltage. If a voltage of the battery 19 is below the predetermined voltage, the microcomputer 10 proceeds from the step 60 to a step 61, stops the reverse driving of the film feed motor 21, and goes to the standby status. If a voltage of the battery 19 is equal to or above the predetermined voltage, the microcomputer 10, proceeding from the step 60 to a step 62, stops the reverse driving of the film feed motor 21, and in a step 63 to follow, performs a feed anomaly display on the display unit 18 to urge a repair and erases the first frame set signal of the E$^2$PROM$^{17}$, and goes to the standby status. If the battery 19 is taken out in the middle of a first frame setting, erasure of the first frame set signal of the step 59 is not done. If a first frame setting is stopped in the middle because of exhaustion of the battery 19, the microcomputer 10 goes to the standby status through steps 53, 60 and 61, and likewise erasure of the first frame set signal of the step 59 is not done. Additionally, a first frame set signal is erased in the case of a feed anomaly in the step 63 so that the camera system will not start from a first frame setting after a repair to the feed anomaly.

Now, suppose the battery 19 is taken out during a pre-winding and the pre-winding is stopped in the middle, and after that the battery is reloaded. The microcomputer 10, if the battery 19 is loaded within a time that the power source is backed up by the backup capacitor, starts a control of FIG. 3. The microcomputer 10 enters the judgment of existence/non-existence of a pre-wind signal of the step 30 of FIG. 3, and as a pre-wind signal is left written in the $E^2PROM^{17}$, the microcomputer 10 proceeds from the step 30 of FIG. 3 to a step 64 of FIG. 4. The microcomputer, after regularly driving the film feed motor 21 in the step 64, enters the step 37 and continues the pre-winding. If the battery 19 is loaded after a time that the power source is backed up passes, a reset signal is given from the auto reset circuit 15 to the microcomputer 10, and the microcomputer 10 starts a processing of power-on reset of FIG. 6. The microcomputer 10, through initialization of a step 65 of FIG. 6 and setting of a number of frames of the film memorized in the $E^2PROM^{17}$ of a step 66, enters a judgment of existence/non-existence of a pre-wind signal of a step 67, and as a pre-wind signal is left written in the $E^2PROM^{17}$, proceeds to the step 64 of FIG. 4 from the step 67 and continues the pre-winding.

Suppose that the battery 19 is taken out during a first frame setting and the first frame setting is stopped in the middle, and after that the battery 19 is reloaded. If the battery 19 is loaded within a time that the power source is backed up by the backup capacitor, the microcomputer 10 starts a control of FIG. 3. The microcomputer 10 enters a judgment of existence/non-existence of a first frame set signal of the step 31 through the step 30. As a first frame set signal is left written in the $E^2PROM^{17}$, the microcomputer 10 proceeds to from the step 31 of FIG. 3 to a step 68 of FIG. 5. The microcomputer 10, after reversely driving the film feed motor 21 in the step 68, enters the step 52 and continues the first frame setting. If the battery 19 is loaded after a time that the power source is backed up passes, a reset signal is given from the auto reset circuit 15 to the microcomputer 10, and the microcomputer 10 starts a processing of power-on reset as illustrated in FIG. 6. The microcomputer 10, through an initialization of the step 65, a setting of a number of frames of the film memorized in the $E2PROM^{17}$ of the step 66, and a judgment of existence/non-existence of a pre-wind signal of the step 67, enters a judgment of existence/non-existence of a first frame set signal of a step 69. As a first frame set signal is left written in the $E2PROM^{17}$, the microcomputer 10 enters from the step 69 of FIG. 6 to the step 68 of FIG. 5, and continues the first frame setting.

When the main switch 11 is operated, the microcomputer 10 proceeds to a step 71 through steps 30, 31 and 32 of FIG. 3 and the step 70, and after performing an input processing of the operating switches including the release switch in the step 71, the microcomputer 10 goes to the standby status. As there is no change if the rear lid switch 12 is left on under a status when the rear lid of the camera is closed, the microcomputer 10 proceeds from the step 32 to the step 70. When the rear lid of the camera is opened and the rear lid switch 12 is made off, the microcomputer 10 goes to the standby status from the step 32 and through a well-known processing of opening the lid (not shown in the drawing). When the main switch 11 is made off, the microcomputer 10, through a well-known processing of making the main switch off (not shown in the drawing), goes to the standby status. By a power-on reset of FIG. 6, the microcomputer 10, if a pre-wind signal and a first frame set signal is not written in the $E^2PROM^{17}$, enters a judgment whether or not a picturable number of remaining frames is 0 at a step 72 through steps 65, 66, 67 and 69. If a number of remaining frames is 0, the microcomputer 10, after performing a well-known processing of power-on reset in the step 63, including a display of power-on reset, a processing of winding the film to the patrone, etc., finishes the power-on reset. If a number of remaining frames is not 0, the microcomputer 10 immediately finishes the power-on reset.

According to the foregoing first fundamental embodiment and the first preferred embodiment, a pre-wind signal, a first frame set signal and a number of frames of the film counted during a pre-winding are written in the $E^2PROM^{17}$, and if the battery is exhausted in the middle of a pre-winding or a first frame setting to stop the pre-winding or the first frame setting in the middle and another battery is loaded after that, the pre-winding or the first frame setting is continued based on these data. Because of this, and as a pre-winding or a first frame setting is continued when another battery is loaded even if the pre-winding or the first frame setting is stopped in the middle because the battery is taken out or exhausted in the middle of the pre-winding or the first frame setting, the film is prevented from being wasted and a the difficulties in of reloading the film can be solved.

Figure 7:
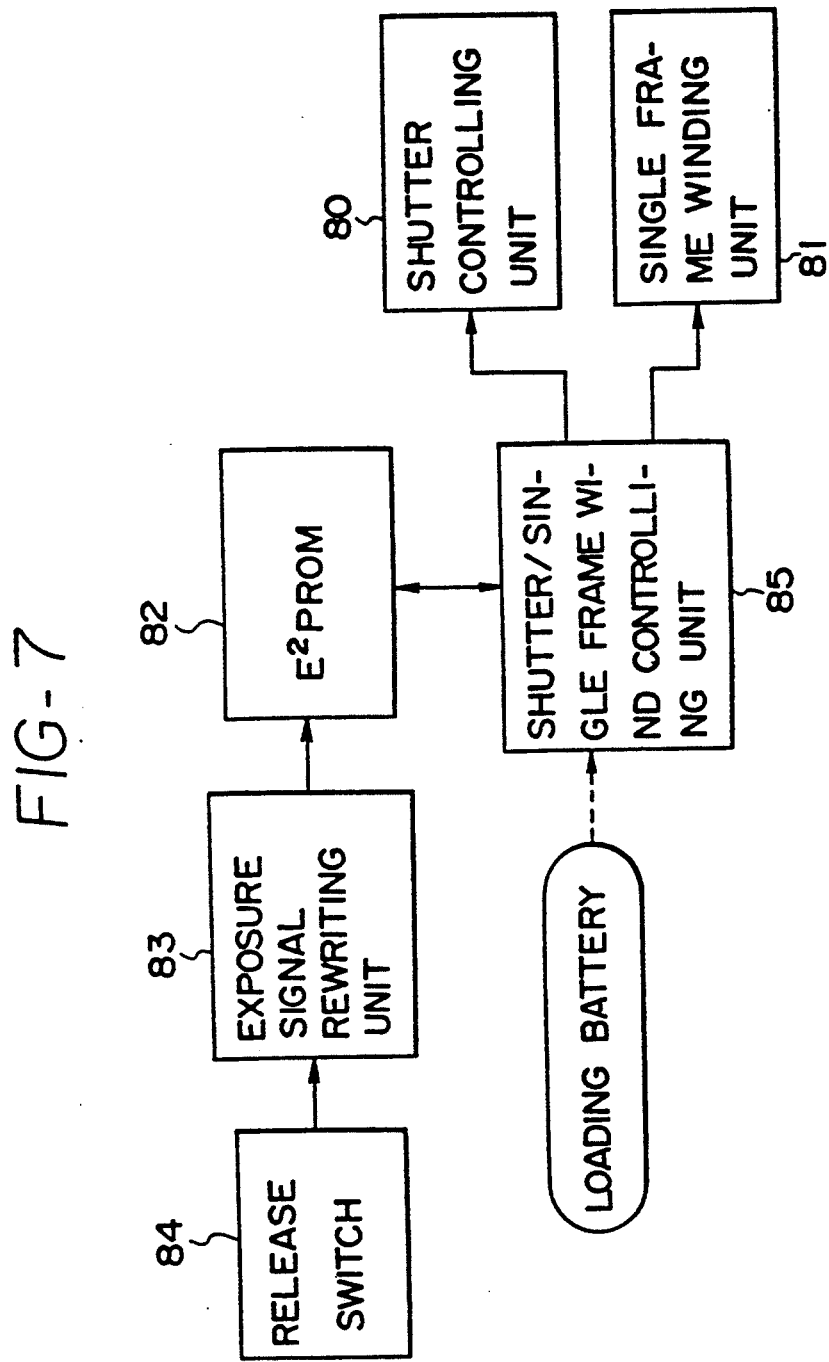
FIG. 7 is a block diagram showing a second fundamental embodiment of the camera control device according to the present invention.

In a second fundamental embodiment of FIG. 7, a reference numeral 80 refers to a shutter controlling unit for opening/closing the shutter. A reference numeral 81 refers to a single frame winding unit for winding a film by one frame. A reference numeral 82 refers to an electrically rewritable non-volatile memory $E^2PROM$. A reference numeral 83 refers to an exposure signal rewriting unit. The exposure signal rewriting unit 83, responsive to an on state of a release switch 84, writes an exposure signal to the $E^2PROM^{82}$ before a start of exposure, and erases the exposure signal of the $E^2PROM^{82}$ when the exposure is finished normally. A reference numeral 85 refers to a shutter/single frame winding unit. The shutter/single frame winding unit 85, responsive to a loading of a battery, drives the shutter control unit 80 and closes the shutter, and after that drives the single frame winding unit 81 and winds the film by one frame when an exposure signal is left written in the $E^2PROM^{82}$. According to a composition like this, when the release switch 84 is made on, the exposure signal rewriting unit 83 writes an exposure signal to the $E^2PROM^{82}$ before a start of exposure, and erases the exposure signal in the $E^2PROM^{82}$ when the exposure is finished normally. If the battery is taken out during an exposure, erasure of an exposure signal is not done as a result when the exposure is not finished normally, and the exposure signal is left in the $E^2PROM^{82}$. When another battery is loaded, the shutter/single frame wind controlling unit 85, based on a fact that an exposure signal is left in the $E^2PROM^{82}$, drives the shutter controlling unit 80 and closes the shutter, and after that drives the single frame winding unit 81 and wind the film by one frame. By this, double exposure is prevented, and loss of a picturable number of frames of the film can be avoided. The foregoing contents of the second fundamental embodiment will be better understood by means of the undermentioned second preferred embodiment.

Figure 8:
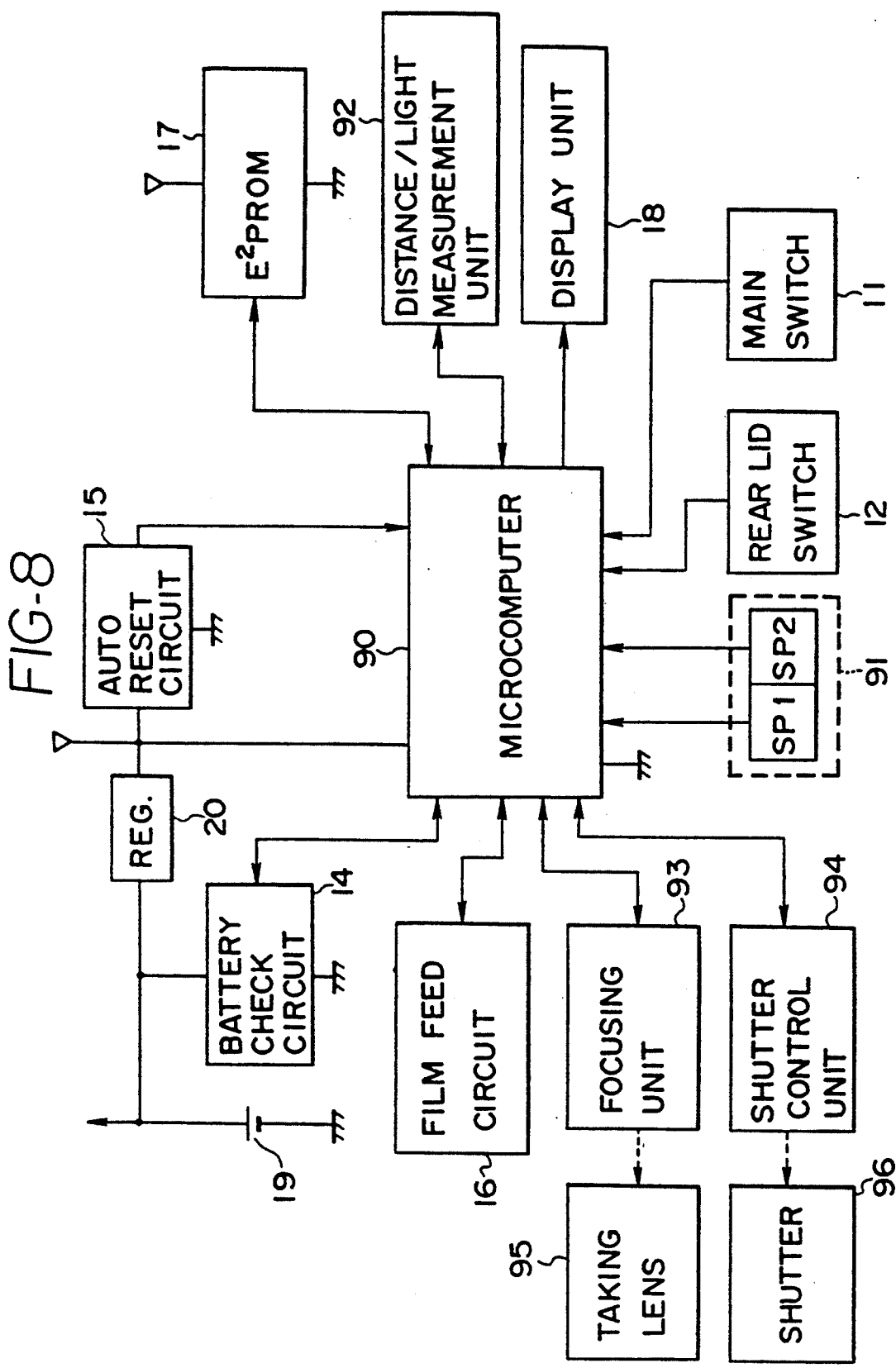
FIG. 8 is a block diagram showing a second preferred embodiment of the camera control device according to the present invention.

In the second preferred embodiment of FIG. 8, a reference numeral 90 refers to a microcomputer. The microcomputer 90 receives on/off signals from a main switch 11, on/off signals from a rear lid switch 12, a start signal and a release signal from a release switch 91, and a reset signal from an auto reset circuit 15. The microcomputer 90 controls a battery check circuit 14, a distance/light measurement unit 92, a focusing unit 93, a shutter control unit 94, a file feed circuit 16 and a display unit 18, and performs writing/reading of an $E^2PROM^{17}$. A power source of the focusing unit 93, the shutter control unit 94 and the distance/light measurement unit 92 is given by a battery 19.

The release switch 91 is a push button switch by two-step composition including a first step switch SP1 and a second step switch SP. The release switch 91, when the first step switch SP1 is made on, gives a start signal for starting distance measurement and light measurement to the microcomputer 90, and when the second step switch SP2 is made on, the release switch 91 gives a release switch for starting exposure to the microcomputer 90. The distance/light measurement unit 92 performs distance measurement and light measurement under a control of the microcomputer 90, and gives distance measurement information and light measurement information to the microcomputer 90. The focusing unit 93, under a control of the microcomputer 90, performs lens setting for delivering a taking lens 95 to a focus position, and performs lens resetting for returning the taking lens 95 to a home position. The focusing unit 93, when the taking lens 95 is set to the focus position, gives a lens 95 set signal to the microcomputer 90, and when the taking lens is returned to the home position, gives a lens reset signal to the microcomputer 90. The shutter control unit 94 opens/closes a shutter 96 under a control of the microcomputer 90. The shutter control unit 94 gives the microcomputer 90 a shutter home position signal when the shutter 96 is closed and returns to a home position. Other details of composition are the same as details of the composition described in the first preferred embodiment.

The microcomputer 90, responsive to an on state of the second step switch SP2 of the release switch 91, writes an exposure signal to the $E^2PROM^{17}$ before a start of exposure, and when an exposure is finished normally, erases the exposure signal of the $E^2PROM^{17}$. If a battery 19 is taken out during an exposure, erasure of an exposure signal is not done, and the exposure signal is left written in the $E^2PROM^{17}$. When the battery 19 is loaded, the microcomputer 90 drives the shutter control unit 94 and closes the shutter 96 as an exposure signal is left written in the $E^2PROM^{17}$. After closing the shutter 96, the microcomputer 90 drives the film feed circuit 16 and winds a film by one frame. The forgoing functions of the microcomputer 90 will be better understood by means of FIGS. 9, 10 and 11.

Figure 9:
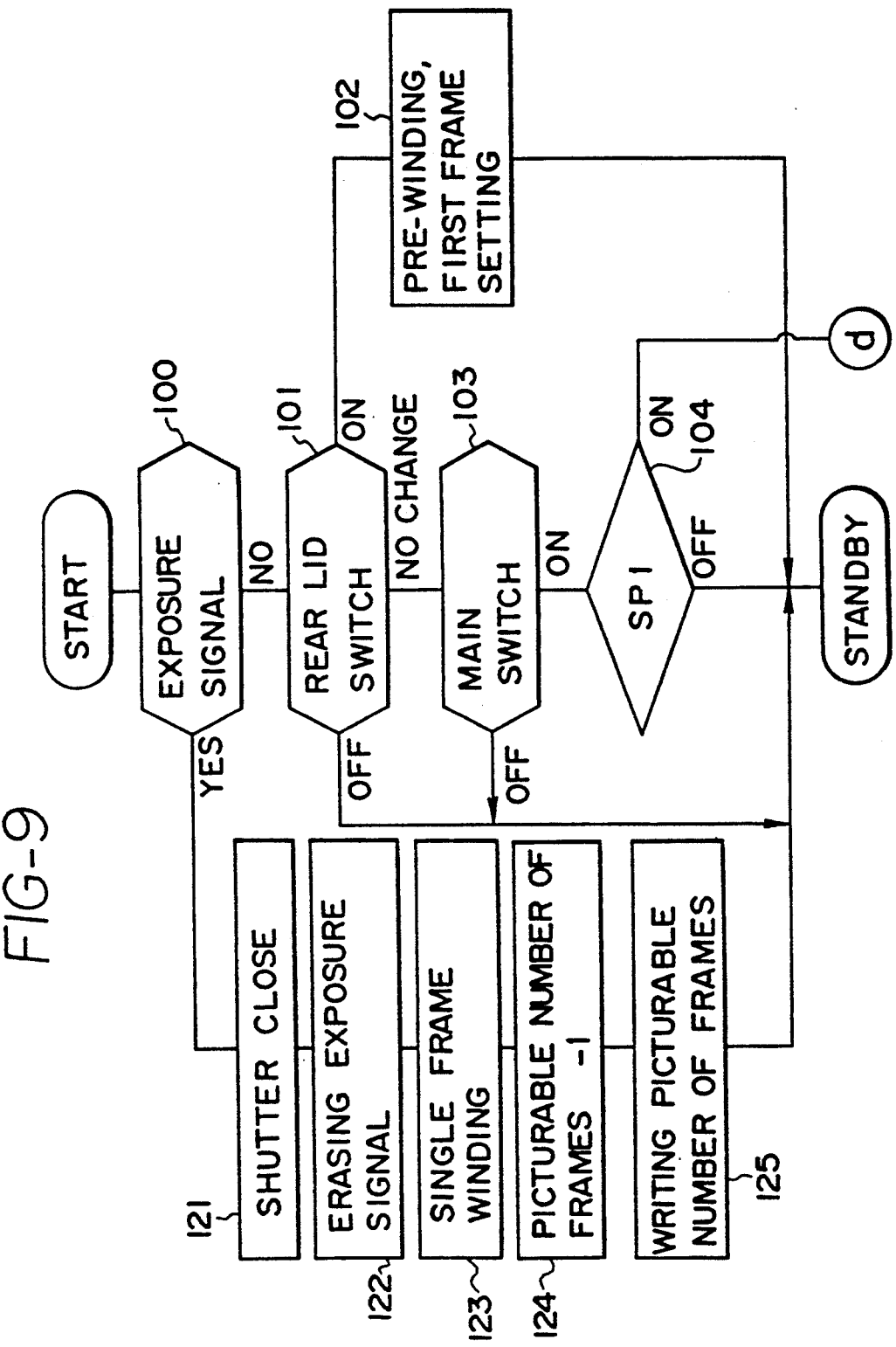
FIG. 9 is a flow diagram of a microcomputer of FIG. 8, showing a processing executed by switch operation or when a battery is loaded within a time that a power source is backed up.
Figure 10:
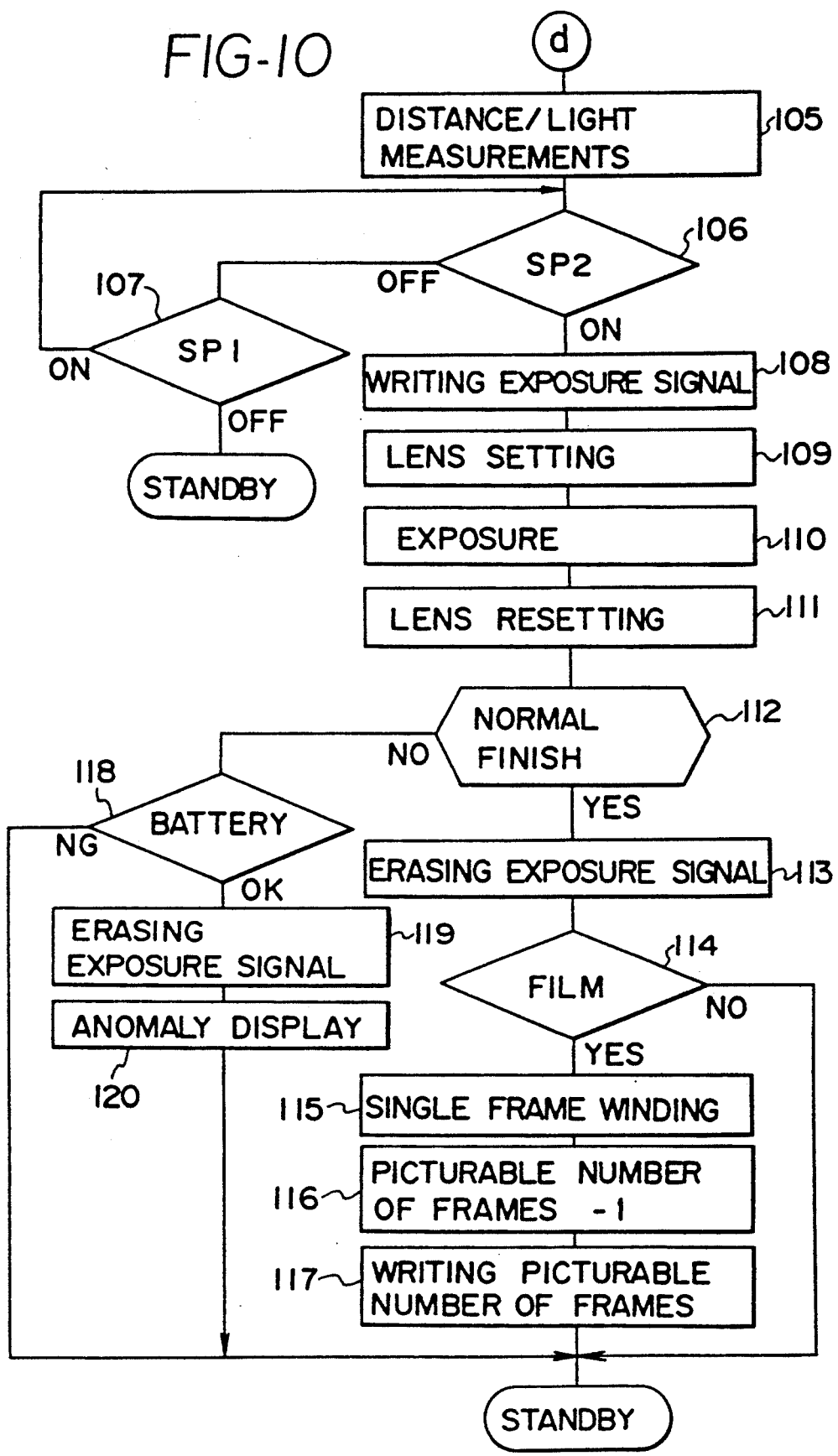
FIG. 10 is a flow diagram of the microcomputer of FIG. 8, showing a release processing.
Figure 11:
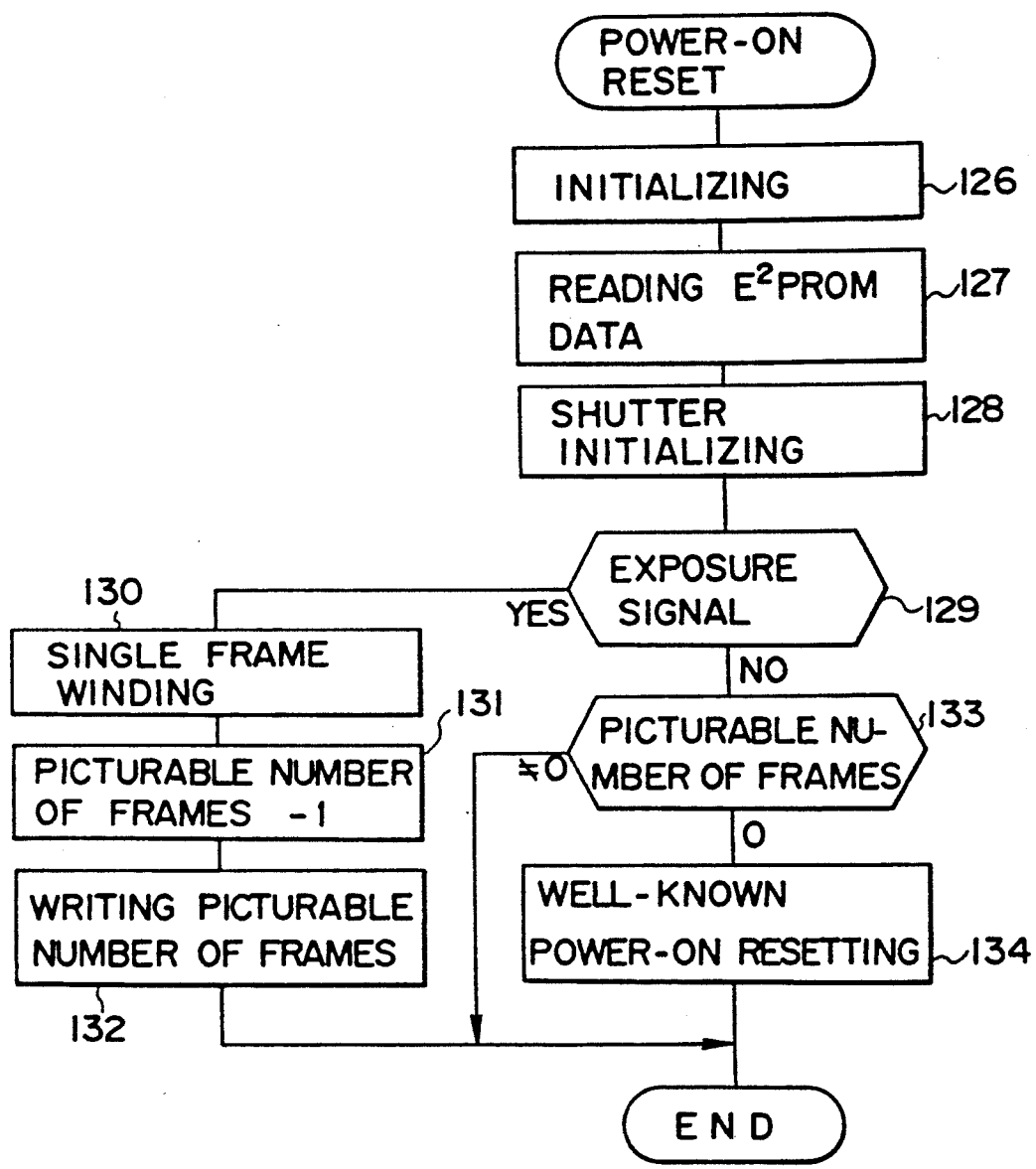
FIG. 11 is a flow diagram of the microcomputer of FIG. 8, showing a processing of power-on reset executed when a battery is loaded after the time that the power source is backed up passes.

FIGS. 9, 10 and 11 are flow diagrams of the microcomputer 90 of FIG. 8. FIG. 9 shows a processing executed when the battery 19 is loaded within a time that a power source is backed up. FIG. 11 shows a processing of power-on reset executed when the battery 19 is loaded after the time that the power source is backed up passes. A terminal d of FIG. 9 is connected to a terminal d, having the same mark, of FIG. 10.

When a film is loaded and the rear lid of the camera is closed, the rear lid switch 12 gives an on signal to the microcomputer 90. By this, the microcomputer 90 starts a processing of FIG. 3. The microcomputer 90, through a judgment of existence/non-existence of an exposure signal of a step 100 and a status judgment of the rear lid switch 12 of a step 101, performs a pre-winding and a first frame setting of a step 102, and goes to a standby status when these judgments are finished. In the pre-winding and the first frame setting, as described in the first preferred embodiment, the microcomputer 90 performs a pre-winding of the film of the patrone to the spool while counting a number of frames of the film wound up to the spool. After the film is wound up to the spool completely, the film is rewound to the patrone by a prescribed length for setting a first frame of the film. Also, in the pre-winding and the first frame setting, a picturable number of frames is written in the $E^2PROM^{17}$. When the main switch 11 is made on, the rear lid switch 12 stays on and makes no change if the rear lid of the camera is left closed, so the microcomputer 90 enters an on/off judgment of the main switch 11 of a step 103 through steps 100 and 101, and then enters a step 104. By this, the release switch 91 is enabled. If the first step switch SP1 of the release switch 91 is off, the microcomputer 90 becomes a standby status, and if the first step switch SP1 is on, the microcomputer 90 enters a release processing of FIG. 10.

In the release processing of FIG. 10, the microcomputer 90 takes in a distance measurement information and a light measurement information by driving the distance/light measurement unit 92 in a step 105, and proceeds to a step 106 after that. The microcomputer 90 conducts an on/off judgment of the second step switch SP2 of the release switch 91 in the step 106. If the second step switch SP2 is off, the microcomputer 90 enters an on/off judgment of the first step switch SP1 in the step 107, and if the second step switch SP2 is on, the microcomputer 90 enters a step 108. The microcomputer 90, if the first step switch SP1 is on in the step 107, returns to the step 106, and if the first step switch SP1 is off, the microcomputer 90 goes to the standby status. In the step 108, an exposure signal is written in the $E^2PROM^{17}$. After the step 108, the microcomputer 90 enters exposure controls of steps 109, 110 and 111. In the step 109, the focusing unit 93 is controlled, and the taking lens 95 is set to a lens position corresponding to the distance information. In the step 110, the shutter control unit 94 is controlled, and opening/closing of the shutter 96 is performed according to the light information.

In the step 111, the focusing unit 93 is controlled, and the taking lens 95 is returned to a home position. The microcomputer 90 enters a step 112 after the exposure control, and judges whether or not the exposure is finished normally. In the present embodiment, the microcomputer 90 judges that the exposure is finished normally by receiving a lens set signal from the focusing unit 93, a home position signal from the shutter control unit 94, and a lens reset signal from the focusing unit 93. The microcomputer 90, by judging that the exposure is finished normally, enters a step 113 and erases the exposure signal in the $E^2PROM^{17}$, and enters a step 114 to follow. In the step 114, existence/non-existence of a film is judged based on a current picturable number of frames of the film. If there is a film, the microcomputer 90 goes to the standby status through steps 115, 116 and 117, and if there is no film, the microcomputer 90 goes to the standby status without performing processings of steps 115–117. In the step 115, the film feed circuit 16 is controlled, and a processing of single frame winding for winding the film by one frame to the patrone is performed. In the step 116, a number of picturable frames is decremented by −1, and a number of frames display of the display unit 18 is renewed. In the step 117, a current number of picturable frames of the film is rewritten to the $E^2PROM^{17}$. The microcomputer 90, judging that a home position signal is not given from the shutter control unit 94 and an exposure is not finished normally, for example, enters from the step 112 to a step 118.

The microcomputer 90 takes in a battery check information from the battery check circuit 14, and judges whether or not a voltage of the battery 19 is equal to or above a predetermined voltage. If the voltage of the battery 19 is equal to or above the predetermined voltage, the microcomputer 90, recognizing that an anomaly is generated in the exposure operation, erases the exposure signal in the $E^2PROM^{17}$ in a step 119, and in a step 120 to follow, displays the anomaly of exposure operation, and goes to the standby status. The microcomputer 90, if the voltage of the battery 19 is below the predetermined voltage, goes to the standby status without performing the processing of steps 119 and 120. If the battery 19 is taken out during an exposure, erasure of the exposure signal of the step 113 is not done. Also, if an exposure operation is stopped in the middle because of exhaustion of the battery 19, the microcomputer 90 goes to the standby status through steps 112 and 118, and likewise erasure of the exposure signal of the step 113 is not done. Incidentally, the exposure signal being erased in the step 119 in the case of an anomaly prevents the camera system from performing a control based on an existence of the exposure signal when the battery is reloaded after repairing the anomaly.

Suppose the battery 19 is taken out during an exposure and the battery 19 is reloaded under a status that the exposure operation is stopped in the middle. The microcomputer 90, if the battery 19 is reloaded within a time that a power source is backed up by a backup capacitor, starts a processing of FIG. 9. As an exposure signal is left written in the $E^2PROM^{17}$ the microcomputer 90 enters from a judgment of existence/non-existence of an exposure signal of the step 100 to a step 121. The microcomputer 90, by controlling the shutter control unit 94 in a step 121, closes the shutter 96 and returns the shutter 96 to a home position, and erases the exposure signal in the $E^2PROM^{17}$ in a step 122 to follow. The microcomputer 90, winding the film by one frame by controlling the film feed circuit 16 in a step 123, decrements a picturable number of frames of the film by −1 in a step 124, writes a current picturable number of frames of the film to the $E^2PROM^{17}$ in a step 125, and goes to the standby status. If the battery 19 is reloaded after the time that the power source is backed up passes, a reset signal is given from the auto reset circuit 15 to the microcomputer 90, and the microcomputer 90 starts a processing of FIG. 11.

The microcomputer 90, through an initialization of a step 126 and a reading of the $E^2PROM^{17}$ of a step 127, enters an initialization of the shutter 96 of a step 128 to close and return the shutter 96, and enters a judgment of existence/non-existence of an exposure signal of a step 129 to follow. As an exposure signal is left written in the $E^2PROM^{17}$, the microcomputer 90 entering from the step 129 to a step 130, winds the film by one frame in the step 130, decrements a picturable number of frames of the film by −1 in a step 131, writes a current picturable number of frames of the film to the $E^2PROM^{17}$ in a step 132, and finishes a power-on reset. Therefore, double exposure will not be caused and the film will not be rewound to the patrone by picturing after the battery 19 is reloaded.

If the battery 19 is taken out under the standby status and not during an exposure, for example, an exposure signal written in the $E^2PROM^{17}$ is erased because an exposure operation was finished normally, processing of steps 121–125 of FIG. 5 are not performed and processing of steps 130–132 of FIG. 11 are not performed. Therefore, picturable frames of the film will not be lost.

In FIG. 9, the microcomputer 90, when the rear lid of the camera is opened and the rear lid switch 12 is made off, goes from the step 101 through a well-known processing of opening the rear lid (not show in the drawing) to the standby status, and when the main switch 12 is made off, the microcomputer 90 goes from the step 103 through a well-known processing of making the main switch off (not shown in the drawing) to the standby status. In FIG. 11, if an exposure signal is not written in the $E^2PROM^{17}$, the microcomputer 90 enters from the step 129 to the step 133, and judges whether or not a picturable number of frames is 0. If the picturable number of frames is 0, the microcomputer 90 performs a well-known processing of power-on reset, including a displaying of power-on reset and a film wind processing for winding the film to the patrone, and the microcomputer 90 finishes the power-on reset. The microcomputer 90, if the picturable number of frames is not 0, finishes the power-on reset without performing the processing of the step 134.

Figure 12:
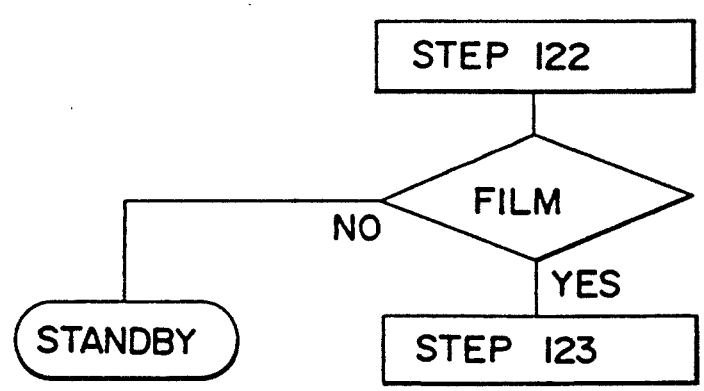
FIG. 12 is a major part of a flow diagram of the microcomputer of FIG. 8 showing an example of the control difference from the example of FIG. 9, which is inserted between steps 122 and 123 of the flow diagram of FIG. 9.
Figure 13:
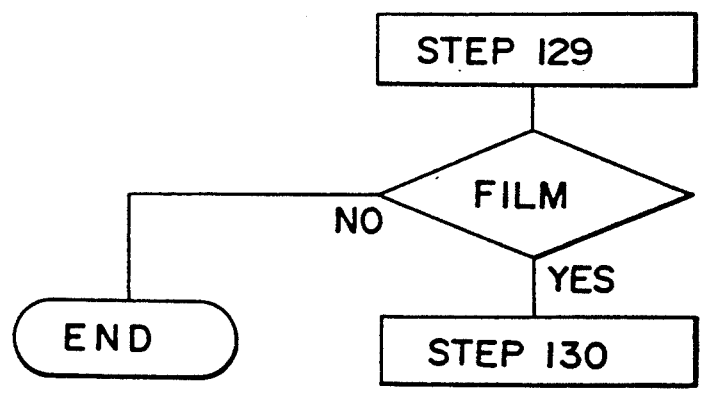
FIG. 13 is a major part of a flow diagram of the microcomputer of FIG. 8 showing an example of the control difference from an example of FIG. 11, which is inserted between steps 129 and 130.

FIGS. 12 and 13 are major parts of the flow diagram of the microcomputer 90 of FIG. 8, showing examples of control differences from the controls of FIGS. 9 and 11. FIG. 12 is a step of judging existence/non-existence of a film which is inserted between steps 122 and 123 of FIG. 9. FIG. 13 is a step of judging existence/non-existence of a film which is inserted between steps 129 and 130 of FIG. 11. If steps of FIGS. 12 and 13 are added to FIGS. 9 and 11, and in the case that the battery 19 is taken out during an exposure and the exposure operation is stopped in the middle and after that the battery 19 is reloaded, a single frame winding of film is performed after a processing of closing the shutter 96 if a film exists, and the single frame winding of films is not done after the processing of closing the shutter 96. By this, a wasteful exhaustion of the battery 19 can be avoided.

According to the foregoing second fundamental embodiment and second preferred embodiment, an exposure signal is left in an $E^2PROM$ in the case that an exposure operation is stopped in the middle because a battery is taken out or because of exhaustion of the battery, and when another battery is loaded, a shutter is closed based on a fact that the exposure signal is left, and after that a single frame winding is performed. Because of this, in the case that the exposure operation is stopped in the middle because the battery is taken out or because of exhaustion of the battery and another battery is loaded after that, double exposure is avoided, and as a film is not rewound to the patrone, loss of the film can be prevented. Also, as a the single frame winding is not always performed at the time of loading battery, loss of picturable frames of the film does not occur. Moreover, by composing so that a single frame winding is performed after closing the shutter in the case that a film exists and a single frame winding is not performed after the shutter is closed in the case that a film does not exist, wasteful exhaustion of the battery can be avoided.

Figure 14:
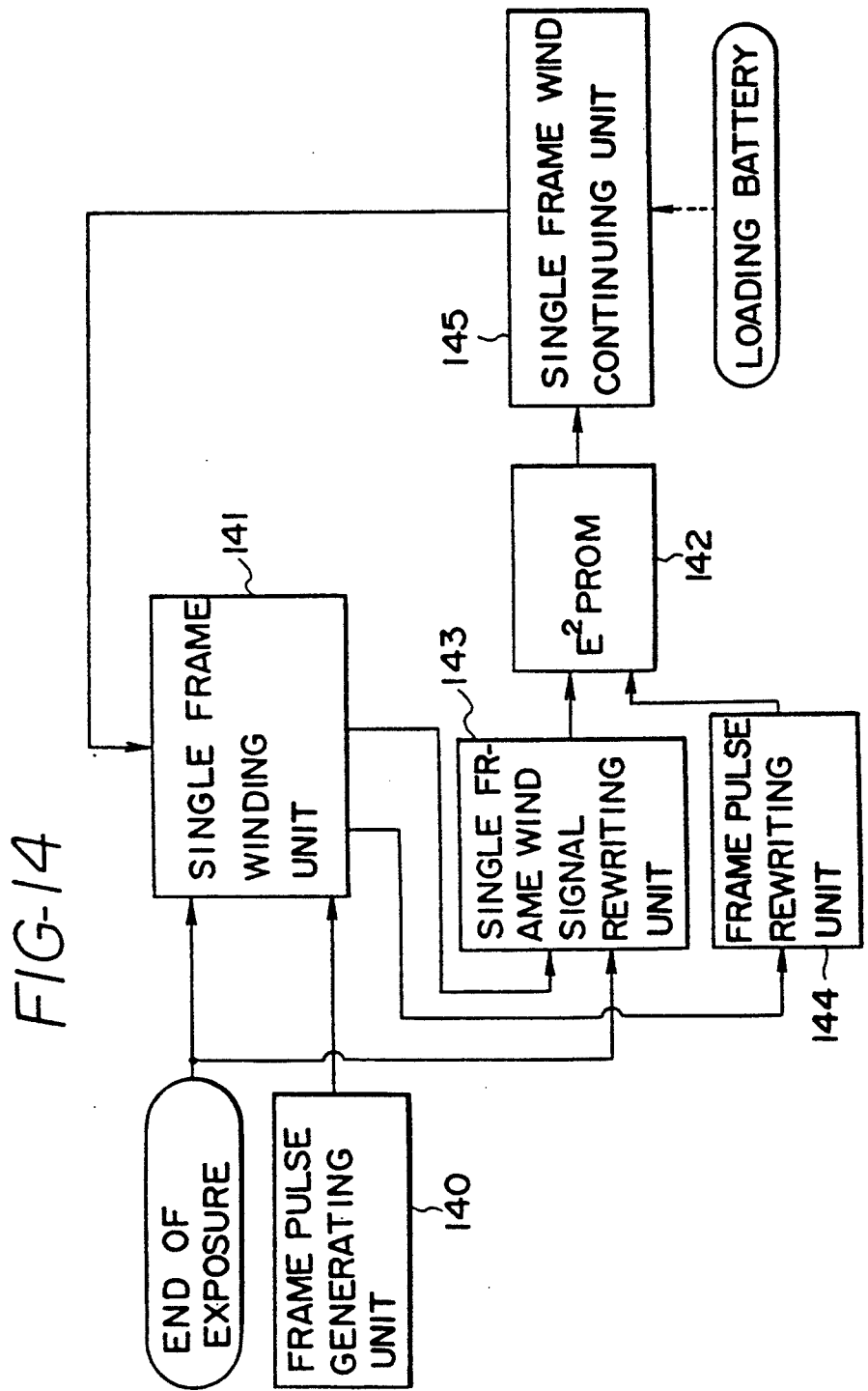
FIG. 14 is a block diagram showing a third fundamental embodiment of the camera control device according to the present invention.

In a third fundamental embodiment of FIG. 14, frame pulse generating means 140 generate a frame pulse each time a film is fed by a prescribed length. Single frame winding unit 141, responsive to an end of an exposure, starts a single frame winding of the film and counts frame pulses from the frame pulse generating unit 140, and when the frame pulses reach a predetermined number after the start of the single frame winding, finishes the single frame winding of the film. A reference numeral 142 refers to an electrically rewritable nonvolatile memory $E^2PROM$. A single frame wind signal rewriting unit 143 writes a single frame wind signal to the $E^2PROM$142 responding to the end of the exposure, and erase the single frame wind signal in the responding to the $E^2PROM^{142}$. A pulse rewriting unit 144 rewrites a count value to the $E^2PROM^{142}$ each time the single frame winding means 141 count a frame pulse. A single frame winding unit 145, responsive to loading of the battery and when the single frame wind signal is left written in the $E^2PROM^{142}$ drives the frame pulse winding unit 141 using the count value memorized in the $E^2PROM^{142}$. According to a composition like this, when an exposure is finished, the single frame winding unit 141 starts a single frame winding of the film, and the single frame winding unit 143 writes a single frame wind signal in the $E^2PROM^{142}$.

The single frame winding unit 141 counts frame pulses from the frame pulse generating unit 140, and finishes the single frame winding when the frame pulses reach a predetermined number. The frame pulse writing unit 144 rewrites a count value to the $E^2PROM^{142}$ each time that the single frame winding unit 141 counts a frame pulse, and the single frame wind signal writing unit 143 erases the single frame wind signal written in the $E^2PROM^{142}$ when the single frame winding is finished. If the single frame winding is stopped in the middle because the battery is taken out or because of exhaustion of the battery during the single frame winding, erasure of the single frame wind signal is not done as a result that the single frame winding is not finished, and the single frame wind signal is left in the $E^2PROM^{142}$. When another battery is loaded, the single frame wind continuing unit 145, by a fact that the single frame wind signal is left written in the $E^2PROM^{142}$, drives the single frame winding means 141 using the count value of frame pulses memorized in the $E^2PROM^{142}$, and continues the single frame winding. Contents of the foregoing third fundamental embodiment will be better understood by means of the undermentioned third preferred embodiment.

Figure 15:
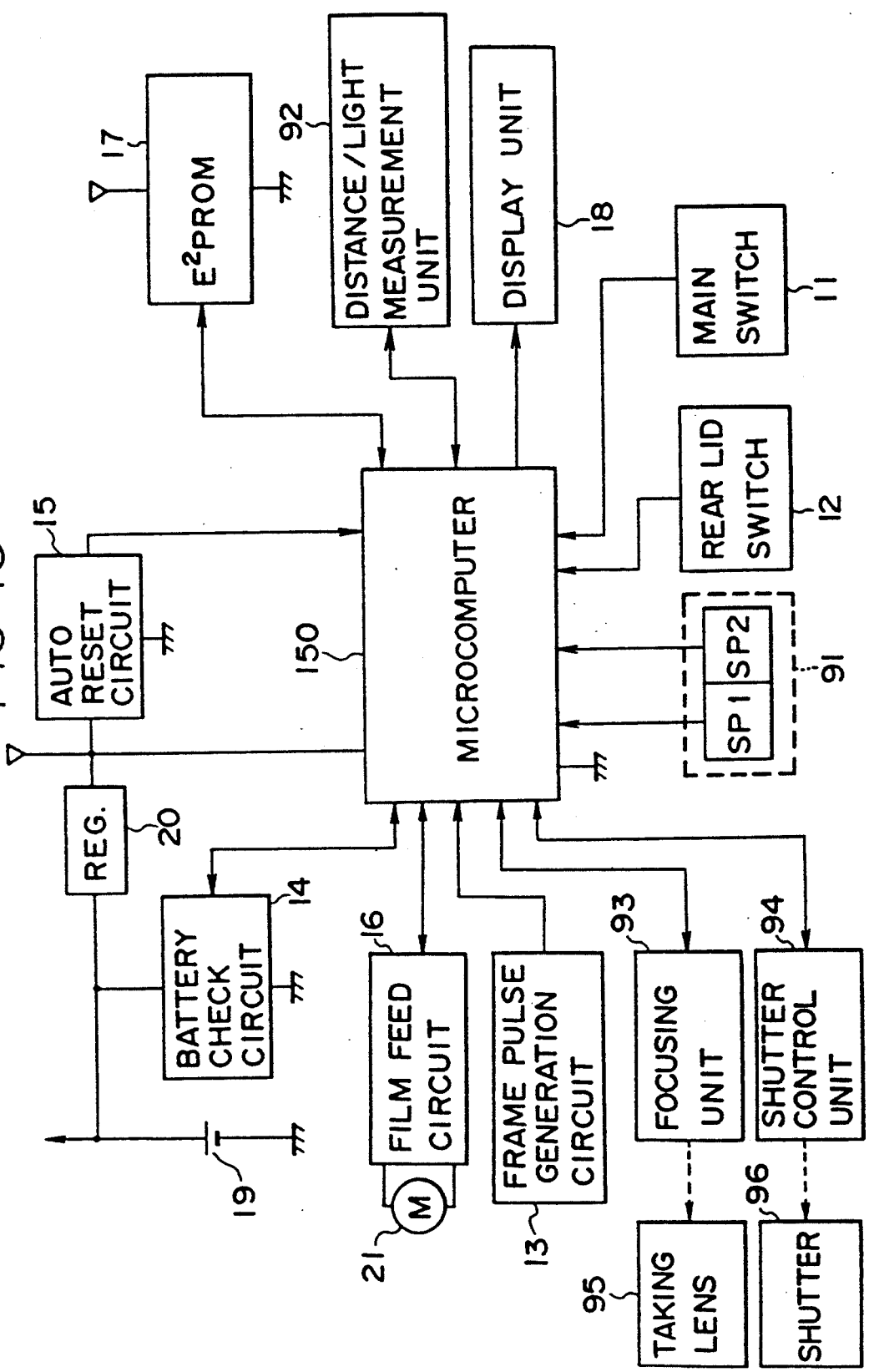
FIG. 15 is a block diagram showing a third preferred embodiment of the camera control device according to the present invention.

In the third preferred embodiment of FIG. 15, a reference numeral 150 refers to a microcomputer. The microcomputer 150 receives on/off signals from a main switch 11, on/off signals from a rear lid switch 12, a start signal and a release signal from a release switch 91, frame pulses from a frame pulse generating circuit 13, and a reset signal from an auto reset circuit 15. A microcomputer 90 controls a battery check circuit 14, a distance/light measurement unit 92, a focusing unit 93, a shutter control unit 94, a film feed circuit 16 and a display unit 18, and writing/reading of an $E^2PROM^{17}$. Other details of composition are the same as details of the composition described in the second preferred embodiment.

The microcomputer 150, when an exposure is finished, starts a single frame winding of a film, and writes a single frame wind signal to the $E^2PROM^{17}$. Moreover, the microcomputer 17 counts frame pulses from the frame pulse generation circuit 13, and rewrites a count value of the frame pulses to the $E^2PROM^{17}$. The microcomputer 150, when frame pulses reach a predetermined number, finishes the single frame winding of the film, and erases the single frame wind signal in the $E^2PROM^{12}$. If a battery 19 is taken out during a single frame winding or the single frame winding is stopped in the middle because of exhaustion of the battery 19, erasure of the single frame signal is not done as a result that the single frame winding is not finished, and the single frame wind signal is left in the $E^2PROM^{17}$. When another battery 19 is loaded, by a fact that the single frame wind signal is left written in the $E^2PROM^{17}$, the single frame winding of the film is continued using the count value of frame pulses memorized in the $E^2PROM^{17}$. The above functions of the microcomputer 150 will be better understood by means of FIGS. 16, 17, 18 and 19.

Figure 16:
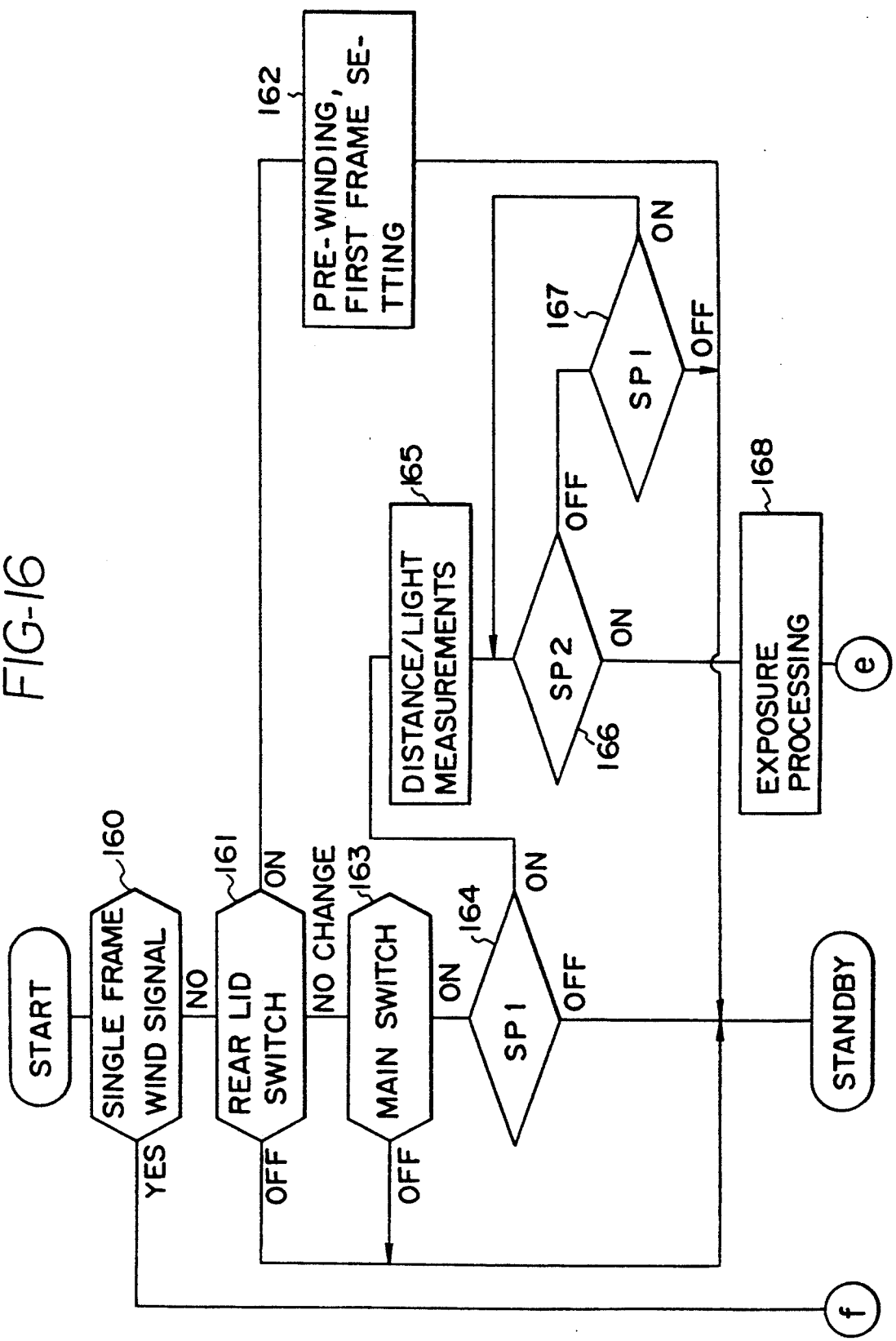
FIG. 16 is a flow diagram of a microcomputer of FIG. 15, showing a processing executed by switch operation or when a battery is loaded within a time that a power source is backed up.
Figure 17:
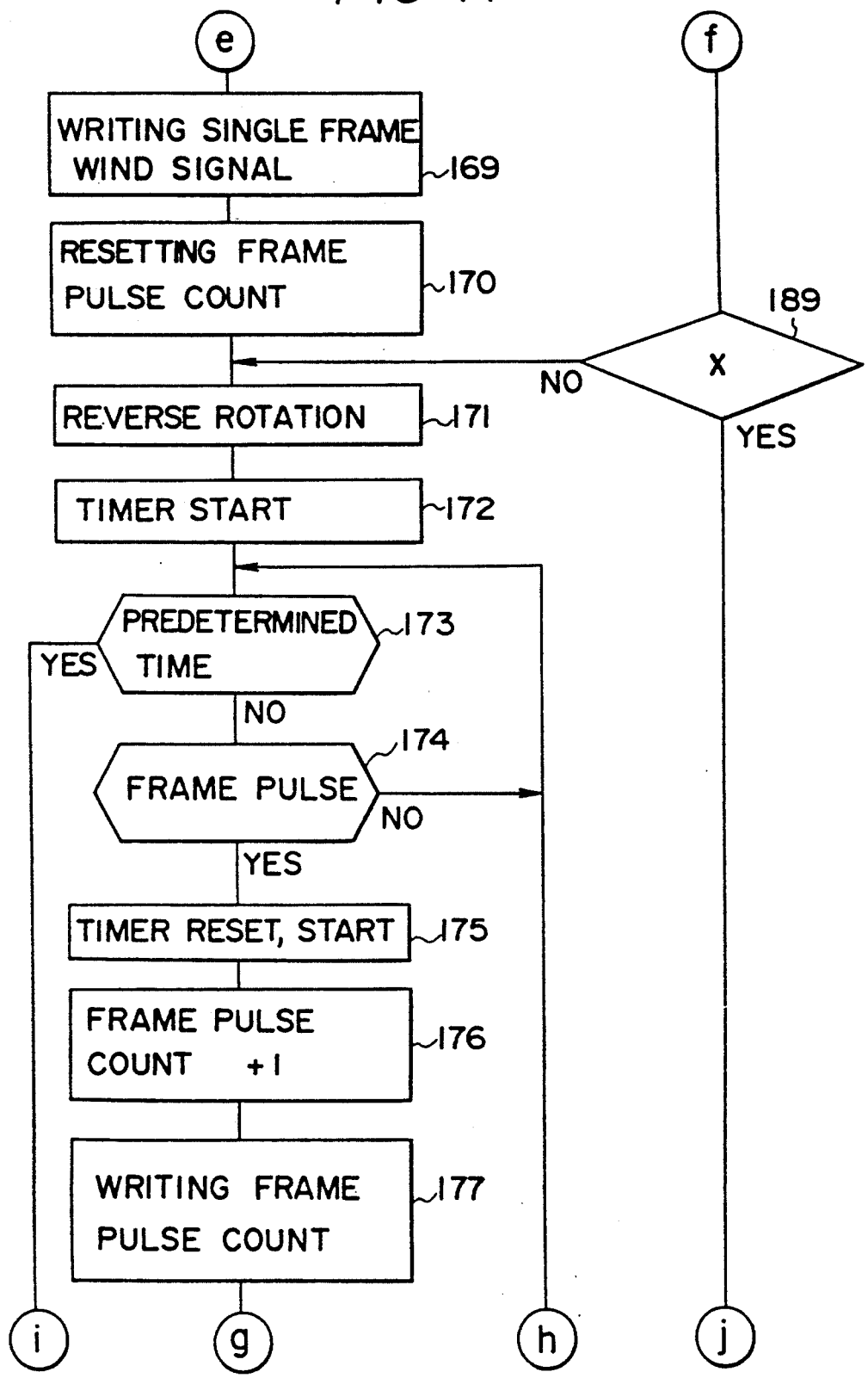
FIG. 17 is a flow diagram of the microcomputer, showing a processing of single frame winding.

FIGS. 16, 17, 18 and 19 are flow diagrams of the microcomputer 150 of FIG. 15. FIG. 16 shows a processing executed by switch operation or when the battery 19 is loaded within a time that a power source is backed up. FIGS. 17 and 18 show processing of a single frame winding of the film. FIG. 19 shows a processing of power-on reset executed when the battery 19 is loaded after the time the power source is backed up. Terminals e, f of FIG. 16 and a terminal f of FIG. 19 are connected to terminals e and f, having the same marks, of FIG. 17. Terminals g, h, i and j of FIG. 17 are connected to terminals g, h, i and j, having the same marks, of FIG. 18.

When a film is loaded and the rear lid of the camera is closed, the rear lid switch 12 gives the microcomputer 150 an on signal. By this, the microcomputer 150 starts a processing of FIG. 16. The microcomputer 150 through a judgment of existence/non-existence of a single frame wind signal of a step 160 and a status judgment of the rear lid switch 12 of a step 162, goes to a standby status after a pre-winding and a first frame setting. In the pre-winding and the first frame setting, as described in the first preferred embodiment, the microcomputer 150 winds the film of the patrone for a pre-winding while counting a number of frames of the film wound up to the spool, and after winding the film up to the spool completely, rewinds the film by a prescribed length to the patrone for setting a first frame of the film. Also, in the pre-winding and the first frame setting, a picturable number of frames of the film is written to the $E^2PROM^{17}$. When the main switch 11 is made on, the rear lid switch 12 stays on and makes no change if the rear lid of the camera is left closed, so the microcomputer 150 enters an on/off judgment of the main switch 11 of a step 163 through steps 160 and 161, and then enters a step 164 through the on/off judgment of the main switch 11. By this, the release switch 91 is enabled. The microcomputer 150 goes to the standby status, if a first step switch SP1 of the release switch 91 is off, and enters a release processing if the first step switch SP1 is on.

In the release processing, the microcomputer 150 takes in a distance measurement information and a light measurement information from the distance/light measurement unit 92 in a step 25, and judges whether a second step switch SP2 of the release switch 91 is on or off in a step 166 to follow. If the second step switch SP2 is off, the microcomputer 150 enters an on/off judgment of a step 167, and if the second step switch SP2 is on, the microcomputer 150 enters an exposure processing of a step 168. If the first step switch SP1 is off in the step 167, the microcomputer 150 returns to the step 166, and if the first step switch SP1 is off in the step 167, the microcomputer 150 goes to the standby status. In the exposure processing of the step 168, the microcomputer 150 delivers a taking lens 95 to a focus position corresponding to the distance measurement information by controlling the focusing unit 93, opens and closes the shutter 96 following the light measurement information by controlling the shutter control unit 94, and returns the taking lens 95 to a home position by controlling the focusing unit 93. After the exposure processing is finished, the microcomputer 150 enters a processing of single frame winding of FIG. 17.

In the single frame winding, the microcomputer 150 writes a single frame wind signal to the $E^2PROM^{17}$ in a step 169, sets a count value of frame pulses in a step 170, and after the processing of steps 169 and 170, starts a single frame winding of the film by reversely driving a film feed motor 21 in a step 171. The microcomputer 150, after the processing of the step 171, sets a predetermined time to an internal timer and starts the timer in a step 172. This predetermined time is set based on a time interval from a time that a frame pulse is given from the frame pulse generation circuit 13 to a time that the next frame pulse is given during a normal pre-winding. The microcomputer 150 judges whether or not the predetermined time is the microcomputer in a step 173 to follow, and if the predetermined time is not passed, judges whether or not a frame pulse is given in a step 174. If a frame pulse is not given, the microcomputer 150 returns from the step 174 to the step 173. If a frame pulse is given, the microcomputer 150 resets and restarts the internal timer in the step 175, and enters a step 176. The microcomputer 150 increments the count value of frame pulses by +1 in the step 176, and writes a current value of frame pulses to the $E^2PROM^{17}$ in a step 177, and enters a step 178 of FIG. 18.

The microcomputer 150 judges whether or not frame pulses reach x pieces in the step 178. If frame pulses have not reached x pieces, the microcomputer 150 returns to the step 173 of FIG. 17. If frame pulses reach x pieces, the microcomputer 150, recognizing that a feed for a single frame is performed, stops the reverse driving of the film feed motor 21 in a step 179, and enters a step 180. In the step 180, the microcomputer 150 erases the single frame signal in the $E^2PROM^{17}$, and enters a step 181. In the step 181, the microcomputer 150 decrements a picturable number of frames of the film by −1 changes a number of the frame display of the display unit 18 in a step 182, writes a current picturable number of frames of the film to the $E^2PROM^{17}$, and goes to the standby status. If a frame pulse is not given for the predetermined time during the single frame winding, the microcomputer 150 enters from the step 173 of FIG. 17 to step 184 of FIG. 18, takes in a battery check information from the battery check circuit 14, and judges whether or not a voltage of the battery 19 is equal to or above a predetermined voltage.

If the voltage of the battery 19 is below the predetermined voltage, the microcomputer 150 proceeds from the step 184 to a step 185, stops the reverse driving of the film feed motor 21, and becomes the standby status. If the voltage of the battery 19 is equal to or above the predetermined voltage, the microcomputer 150 proceeds from the step 184 to a step 186, stops the reverse driving of the film feed motor 21, erases the single frame wind signal in the $E^2PROM17$ in a step 187, displays an error on the display unit 18 in a step 188, and goes to the standby status. If the battery 19 is taken out during a single frame winding of the film, erasure of the single frame wind signal of the step 180 is not done, and, if the single frame winding is stopped in the middle because of exhaustion of the battery 19, the microcomputer 150 goes to the standby status through steps 173, 184 and 185, and likewise the erasure of the single frame wind signal of the step 180 is not done. Additionally, the first frame set signal is erased in the step 187 so that the camera system will not perform a control based on an existence of a single frame signal by loading of another battery 19 after a repair to the anomaly.

Suppose the battery 19 is taken out during a single frame winding of the film to stop the single frame winding in the middle and after that the battery 19 is reloaded. When the battery 19 is reloaded during a the time the power source is backed up by a backup capacitor (not shown in the drawing), the microcomputer 150 starts a control of FIG. 16. As the single frame wind signal is left written in the $E^2PROM^{17}$, the microcomputer 150 enters from the judgment of existence/non-existence of a single frame wind signal of the step 160 to a step 189. In the step 189, the microcomputer 150 judges whether or not the count value of frame pulses has reached x pieces. If the count value of frame pulses has reached x pieces, the microcomputer 150 enters the step 180 of FIG. 18. If frame pulses have not reached x pieces, the microcomputer 150 enters the step 170 and continues the processing of single frame winding.

When the battery 19 is reloaded after the time that the power source is backed up is passes, a reset signal is given from the auto reset circuit 15 to the microcomputer 150. By this, the microcomputer 150 starts a processing of FIG. 19. In a power-on reset of FIG. 19, the microcomputer 150 performs an initializing in a step 190, reads data from the $E^2PROM^{17}$ in a step 191, and judges whether or not a single frame wind signal exists in a step 192. As the single frame wind signal is left written in the $E^2PROM^{17}$, the microcomputer 150 enters from the step 192 to the step 189 of FIG. 17, and continues the single frame winding using the count value of frame pulses and the picturable number of frames of the film memorized in the $E^2PROM^{17}$.

If the battery 19 is taken out under a status other than a single frame winding of the film, under a standby status for example, when the single frame wind signal in the $E^2PROM^{17}$ is erased by the end of the single frame winding, the microcomputer 150, in FIG. 16, proceeds from the step 160 to the step 161 and does not perform a single frame winding, and, in FIG. 19, proceeds from the step 192 to a step 193 and does not perform a single frame winding. In FIG. 16, the microcomputer 150, when the rear lid of the camera is opened and the rear lid switch 12 is made off, goes from the step 161 to the standby status through the well-known processing of opening the rear lid (not shown in the drawing), and when the main switch 11 is made off, goes from the step 163 to the standby status through the well-known processing of making the main switch off (not shown in the drawing). In FIG. 19, the microcomputer 150 performs a judgment of whether or not the picturable number of frames of the film is 0 in the step 193, and, if the picturable number of frames is 0, performs the well-known processing of power-on reset including a power-on reset displaying and a film wind processing for winding the film to the patrone, etc. in the step 194, and finishes the power-on reset. If the picturable number of frames is not 0, the microcomputer 150 finishes the power-on reset without performing the processing of the step 194.

According to the aforementioned third fundamental embodiment and third preferred embodiment, if a battery is taken out during a single frame winding or the single frame winding is stopped in the middle because of exhaustion of the battery and another battery is loaded after that, the single frame winding of the film is continued based on a single frame wind signal written in the $E^2PROM^{17}$ and a count value of frame pulses. Because of this, when a battery is taken out during a single frame winding of the film or the single frame winding is stopped in the middle because of exhaustion of the battery and another battery is loaded, double exposure will not occur, and, as the film is not rewound to the patrone, loss of the film can be avoided. Also, as a single frame winding is not always performed at the time of loading a battery, a picturable number of frames of the film will not be lost.

The second preferred embodiment and the third preferred embodiment have described for applications to a camera of a film pre-wind type, but application of the present invention is not limited to the camera of the pre-wind type.

From the foregoing it will now be apparent that a new and improved camera control device has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A camera control device comprising:
pre-winding means, responsive to a close operation of a rear lid of a camera, for starting a pre-winding for winding a film of a patrone to a spool, said pre-winding means finishing the pre-winding by winding the film of the patrone to the spool completely and counting a picturable number of frames of the film which are wound up to the spool;
first frame setting means, responsive to an end of the pre-winding of said pre-winding means, for starting a first frame setting for setting a first frame of the film, said first frame setting means finishing the first frame setting by rewinding the film to the patrone by a first prescribed length;
an electrically rewritable non-volatile memory $E^2$-PROM;
pre-wind signal rewriting means for writing a pre-wind signal to said $E^2PROM$ in response to a start of the pre-winding of said pre-winding means, and for erasing the pre-wind signal in said $E^2PROM$ in response to an end of the pre-winding of said pre-winding means;
number of frames rewriting means, responsive to a count of the picturable number of frames of the film of said pre-winding means, for rewriting a picturable number of frames of the film to said $E^2PROM$ each time said pre-winding means counts a picturable number of frames of the film;
first frame set signal rewriting means for writing a first frame set signal to said $E^2PROM$ in response to a start of the first frame setting of said first frame setting means, and for erasing the first frame set signal in said $E^2PROM$ in response to an end of the first frame setting of said first frame setting means;
pre-wind/first frame set continuing means, responsive to loading of a battery to the camera, for driving said pre-winding means or said first frame setting means in a case when the pre-wind signal or the first frame set signal is left in said $E^2PROM$, respectively, by using a picturable number of frames of the film memorized in said $E^2PROM$;
frame pulse generating means for generating a frame pulse each time that the film is fed by a second prescribed length; and
battery check means for detecting whether a voltage of the battery is equal to or above a predetermined voltage;
said pre-winding means including,
pre-wind finishing means, responsive to said frame pulse generating means, for finishing the pre-winding by recognizing that the film of the patrone is wound up to the spool completely in a case when a frame pulse fails to be given for more than a predetermined time and the voltage of the battery is above the predetermined voltage, and
pre-wind stopping means, responsive to said frame pulse generating means and said battery check means, for stopping the pre-winding by recognizing that the battery is exhausted in a case when a frame pulse fails to be given for more than the predetermined time and the voltage of the battery is below the predetermined voltage.

2. The device of claim 1 further comprising:
shutter control means for opening/closing a shutter;
single frame without means for winding a frame of the film;
exposure signal rewriting means, responsive to an on operation of a release switch, for writing an exposure signal to said $E^2PROM$ before starting an exposure, said exposure signal rewriting means erasing an exposure signal in said $E^2PROM$ when the exposure is finished normally; and
shutter/single frame wind controlling means, responsive to loading of a battery to the camera, for winding a frame of the film by driving said single frame winding means after closing the shutter by driving said shutter controlling means in a case when the exposure signal is left in said $E^2PROM$.

3. The device of claim 1 further comprising:
single frame winding means for starting a single frame winding of the film responding to an end of exposure, said single frame winding means counting frame pulses of said frame pulse generating means, and finishing the single frame winding when frame pulses reach a predetermined number after starting the single frame winding;
single frame wind signal rewriting means for writing a single frame wind signal to said $E^2PROM$ in response to the end of exposure, and erasing the single frame wind signal in said $E^2PROM$ in response to the end of the single frame winding of the film of said single frame winding means;
frame pulse rewriting means, responsive to a count of frame pulses of said single frame winding means, for rewriting a count value of frame pulses to said $E^2PROM$ each time said single frame winding means counts a frame pulse; and single frame wind continuing means, responsive to loading of a battery to the camera, for driving said single frame winding means using the count value of frame pulses memorized in said E²PROM in a case when the single frame wind signal is left in said E²PROM.

4. The device of claim 1, wherein said pre-winding means includes setting means, responsive to said frame pulse generating means, for setting a picturable number of frames of the film to 1 when a first predetermined number of pieces of frame pulses are given after starting the pre-winding, and for incrementing the picturable number of frames by +1 each time a second predetermined number of pieces of frame pulses are given after that.

5. The device of claim 1, wherein said first frame setting means includes first frame set finishing means, responsive to said frame pulse generating means, for finishing the first frame setting when a third predetermined number of pieces of frame pulses are given after starting the first frame setting.

6. The device of claim 1, wherein said first frame setting means includes,
first frame set processing means, responsive to said frame pulse generating means and said battery check means, for stopping the first frame setting, for displaying a feed anomaly, and for erasing the first frame set signal in said E²PROM by recognizing that an anomaly is generated in feeding of the film in a case when a frame pulse fails to be given for more than the predetermined time and the voltage of the battery is equal to or above the predetermined voltage, and
first frame set stopping means, responsive to said frame pulse generating means and said battery check means, for stopping the first frame setting by recognizing that the battery is exhausted in a case when a frame pulse fails to be given and the voltage of the battery is below the predetermined voltage.

7. A camera control device comprising:
shutter controlling means for opening/closing a shutter;
single frame winding means for winding a film by one frame;
an electrically rewritable non-volatile memory E²PROM;
exposure signal rewriting means, responsive to an on state of a release switch, for writing an exposure signal to said E²PROM before a start of an exposure, said exposure signal rewriting means judging whether the exposure is finished normally and erasing the exposure signal in said E²PROM when the exposure is finished normally;
shutter/single frame wind controlling means, responsive to loading of a battery to the camera, for winding one frame of the film by driving said single frame winding means after closing the shutter by driving said shutter controlling means in a case when the exposure signal is left in said E²PROM;
battery check means for detecting whether a voltage of the battery is equal to or above a predetermined voltage;
erasing/displaying means, responsive to said exposure signal rewriting means and said battery check means, for erasing the exposure signal in said E²PROM and for displaying an anomaly of exposure by recognizing that the anomaly is generated in the exposure in a case when a normal finish of the exposure fails to be recognized and the voltage of the battery is equal to or above the predetermined voltage; and
stopping means, responsive to said exposure signal rewriting means and said battery check means, for stopping an operation by recognizing that the battery is exhausted in a case when a normal finish of the exposure fails to be recognized and the voltage of the battery is below the predetermined voltage.

8. The device of claim 7, wherein said exposure signal rewriting means recognizes a normal finish of an exposure when a taking lens is set to a focus position before the exposure and when the shutter and the taking lens are returned to their home positions after the exposure.

9. The device of claim 7, wherein said shutter/single frame wind controlling means, when a picturable frame exists in the film, drives said single frame winding means and performs a single frame winding of the film after closing the shutter by driving said shutter controlling means, and when a picturable frame fails to exist in the film, said shutter/single frame wind controlling means fails to drive said single frame winding means after closing the shutter by driving said shutter controlling means.

10. A camera control device comprising:
frame pulse generating means for generating a frame pulse each time that a film is fed by a prescribed length;
single frame winding means, responsive to an end of exposure, for starting a single frame winding of the film, said single frame winding means counting frame pulses of said frame pulse generating means and finishing the single frame winding when frame pulses reach a predetermined number after starting the single frame winding;
an electrically rewritable non-volatile memory E²PROM;
single frame wind signal rewriting means for writing a single frame wind signal to said E²PROM in response to an end of exposure, and for erasing the single frame wind signal in said E²PROM in response to the end of single frame winding of the film by said single frame winding means;
frame pulse rewriting means, responsive to a count of frame pulses of said single frame winding means, for rewriting the count value of frame pulses each time that said single frame winding means counts a frame pulse;
single frame winding continuing means, responsive to loading of a battery to the camera, for driving said single frame winding means, by using the count value of frame pulses memorized in said E²PROM, in a case when the single frame wind signal is left in said E²PROM;
battery check means for detecting whether a voltage of the battery is equal to or above a predetermined voltage;
stopping/erasing/displaying means, responsive to said frame pulse generating means and said battery check means, for stopping the single frame winding, erasing the single frame wind signal in said E²PROM and displaying an anomaly by recognizing that the anomaly is generated in the single frame winding in a case when a frame pulse fails to be given for more than a predetermined time and the voltage of the battery is above the predetermined voltage; and stopping means, responsive to said frame pulse generating means and said battery check means, for stopping the single frame winding by recognizing that the battery is exhausted in a case when a frame pulse fails to be given for more than the predetermined time and the voltage of the battery is below the predetermined voltage.

11. A method for controlling a camera comprising the steps of:

(a) starting a pre-winding for winding a film of a patrone to a spool responsive to a close operation of a rear lid of the camera;

(b) finishing the pre-winding by winding the film of the patrone to the spool completely and counting a picturable number of frames of the film which are wound up to the spool;

(c) starting a first frame setting for setting a first frame of the film responsive to an end of the pre-winding at said step (b);

(d) finishing the first frame setting by rewinding the film to the patrone by a first prescribed length;

(e) writing a pre-wind signal to an electrically rewritable non-volatile memory $E^2PROM$ in response to a start of the pre-winding at said step (a);

(f) erasing the pre-wind signal in said $E^2PROM$ in response to an end of the pre-winding at said step (b);

(g) rewriting a picturable number of frames of the film to said $E^2PROM$ each time that a picturable number of frames of the film is counted responsive to a count of the picturable number of frames of the film at said step (b);

(h) writing a first frame set signal to said $E^2PROM$ in response to a start of the first frame setting at said step (c);

(i) erasing the first frame set signal in said $E^2PROM$ in response to an end of the first frame setting at said step (d);

(j) driving the pre-winding at said step (a) or said first frame setting at said step (c) in a case when the pre-wind signal or the first frame set signal is left in said $E^2PROM$, respectively, by using a picturable number of frames of the film memorized in said $E^2PROM$ responsive to loading of a battery to the camera;

(k) generating a frame pulse each time that film is fed by a second prescribed length;

(l) detecting whether a voltage of the battery is equal to or above a predetermined voltage;

(m) finishing the pre-winding by recognizing that the film of the patrone is wound up to the spool completely in a case when a frame pulse fails to be given for more than a predetermined time and the voltage of the battery is above the predetermined voltage responsive to steps (k) and (l); and (n) stopping the pre-winding by recognizing that the battery is exhausted in a case when a frame pulse fails to be given for more than the predetermined time and the voltage of the battery is below the predetermined voltage responsive to said steps (k) and (l).

12. The method of claim 11 further comprising the steps of:

(o) opening/closing a shutter;

(p) winding a frame of the film;

(q) writing an exposure signal to said $E^2PROM$ before starting an exposure responsive to an on operation of a release switch;

(r) erasing an exposure signal in said $E^2PROM$ when the exposure is finished normally; and (s) winding a frame of the film by driving the frame winding at said step (p) after closing the shutter by driving the opening/closing of said shutter at said step (o) in a case when the exposure signal is left in said $E^2PROM$.

13. The method of claim 11 further comprising the steps of:

(o) starting a single frame winding of the film responding to an end of exposure;

(p) counting frame pulses generated at said step (k);

(q) finishing the single frame winding when frame pulses reach a predetermined number after starting the single frame winding;

(r) writing a single frame wind signal to said $E^2PROM$ in response to the end of exposure;

(s) erasing the single frame wind signal in said $E^2PROM$ in response to the end of the single frame winding of the film at said step (q);

(t) rewriting a count value of frame pulses to said $E^2PROM$ each time a frame pulse is counted responsive to a count of frame pulses at said step (p); and (u) driving the single frame winding of the film at said step (o) by using the count value of frame pulses memorized in said $E^2PROM$ in a case when the single frame wind signal is left in said $E^2PROM$.

14. The method of claim 11 further comprising the steps of:

(o) setting a picturable number of frames of the film to 1 when a first predetermined number of pieces of frame pulses are given after starting the pre-winding responsive to said step (k); and (p) incrementing the picturable number of frames by +1 each time a second predetermined number of pieces of frame pulses are given after that responsive to said step (k).

15. The method of claim 11 further comprising the step of:

(o) finishing the first frame setting when a third predetermined number of pieces of frame pulses are given after starting the first frame setting responsive to said step (k).

16. The method of claim 11 further comprising the steps of:

(o) stopping the first frame setting to display a feed anomaly and to erase the first frame set signal in said $E^2PROM$ by recognizing that an anomaly is generated in feeding of the film in a case when a frame pulse fails to be given for more than the predetermined time and the voltage of the battery is equal to or above the predetermined voltage responsive to said steps (k) and (l); and (p) stopping the first frame setting by recognizing that the battery is exhausted in a case when a frame pulse fails to be given and the voltage of the battery is below the predetermined voltage responsive to said steps (k) and (l).

17. A method for controlling a camera comprising the steps of:

(a) opening/closing a shutter with shutter controlling means;

(b) winding a film by one frame with single frame winding means;

(c) writing an exposure signal to an electrically rewritable non-volatile memory $E^2PROM$ before a start of an exposure responsive to an on state of a release switch judging whether the exposure is finished normally and erasing the exposure signal in said E²PROM when the exposure is finished normally;
(d) winding the film by one frame by driving said single frame winding means at said step (b) after closing the shutter by driving said shutter controlling means at said step (a), responsive to loading of a battery to the camera, in a case when the exposure signal is left in said E²PROM;
(e) detecting whether a voltage of the battery is equal to or above a predetermined voltage;
(f) erasing the exposure signal in said E²PROM and displaying an anomaly of exposure by recognizing that the anomaly is generated in the exposure in a case when a normal finish of the exposure fails to be recognized and the voltage of the battery is equal to or above the predetermined voltage responsive to said steps (d) and (e); and
(g) stopping an operation by recognizing that the battery is exhausted in a case when a normal finish of the exposure fails to be recognized and the voltage of the battery is below the predetermined voltage responsive to said steps (c) and (e).

18. The method of claim 17, wherein said step (c) further includes the step of recognizing a normal finish of an exposure when a taking lens is set to a focus position before the exposure and when the shutter and the taking lens are returned to their home positions after the exposure.

19. The method of claim 17, wherein said step (d) further includes the steps of driving said single frame winding means at said step (b) and performing a single frame winding of the film after closing the shutter by driving the opening/closing of said shutter at said step (a) when a picturable frame exists in the film and failing to drive said single frame winding means at said step (b) after closing the shutter by driving the opening/closing of said shutter at said step (a) when a picturable frame fails to exist in the film.

20. A method for controlling a camera comprising the steps of:
(a) generating a frame pulse each time that a film is fed by a prescribed length;
(b) starting a single frame winding of the film by single frame winding means responsive to an end of exposure;
(c) counting frame pulses generated at said step (a);
(d) finishing the single frame winding when frame pulses reach a predetermined number after starting the single frame winding;
(e) writing a single frame wind signal to an electrically rewritable non-volatile memory E²PROM in response to an end of exposure;
(f) erasing the single frame wind signal in said E²PROM in response to the end of the single frame winding of the film at said step (d);
(g) rewriting the count value of frame pulses to said E²PROM each time that a frame pulse is counted at said step (c);
(h) driving said single frame winding means by using the count value of frame pulses memorized in said E²PROM responsive to loading of a battery to the camera;
(i) detecting whether a voltage of the battery is equal to or above a predetermined voltage;
(j) stopping the single frame winding, erasing the single frame wind signal in said E²PROM and displaying an anomaly by recognizing that the anomaly is generated in the single frame winding in a case when a frame pulse fails to be given for more than a predetermined time and the voltage of the battery is above the predetermined voltage responsive to said steps (a) and (i); and
(k) stopping the single frame winding by recognizing that the battery is exhausted in a case when a frame pulse fails to be given for more than a predetermined time and the voltage of the battery is below the predetermined voltage responsive to said steps (a) and (i).

* * * * *